(12) United States Patent
Riedl et al.

(10) Patent No.: US 8,028,322 B2
(45) Date of Patent: Sep. 27, 2011

(54) METHOD AND APPARATUS FOR NETWORK CONTENT DOWNLOAD AND RECORDING

(75) Inventors: Steven Riedl, Superior, CO (US); John Callahan, Broomfield, CO (US); John B. Carlucci, Boulder, CO (US); Hugh Josephs, Boulder, CO (US)

(73) Assignee: Time Warner Cable Inc., New York, NY (US)

( * ) Notice: Subject to any disclaimer, the term of this patent is extended or adjusted under 35 U.S.C. 154(b) by 1883 days.

(21) Appl. No.: 11/080,693

(22) Filed: Mar. 14, 2005

(65) Prior Publication Data

US 2006/0218604 A1  Sep. 28, 2006

(51) Int. Cl.
*H04N 7/173* (2011.01)

(52) U.S. Cl. ........ 725/134; 725/133; 725/141; 725/142; 725/87; 725/89; 725/100; 725/101; 725/109; 725/110; 725/153

(58) Field of Classification Search .......... 725/133, 725/134, 142, 57, 87, 91, 109–110, 112, 725/101, 89, 100; 386/125
See application file for complete search history.

(56) References Cited

U.S. PATENT DOCUMENTS

| | | | |
|---|---|---|---|
| 6,240,401 B1 | 5/2001 | Oren et al. | |
| 6,760,918 B2 * | 7/2004 | Rodriguez et al. | ............ 725/134 |
| 6,959,288 B1 | 10/2005 | Meding | |
| 7,028,009 B2 | 4/2006 | Wang | |
| 7,136,573 B2 * | 11/2006 | Kikuchi et al. | ................. 386/83 |
| 7,203,311 B1 | 4/2007 | Kahn | |
| 7,209,892 B1 | 4/2007 | Galuten | |
| 7,213,742 B1 | 5/2007 | Birch | |
| 7,257,308 B2 | 8/2007 | Plourde | |
| 7,263,188 B2 | 8/2007 | Kohno | |
| 7,337,459 B1 | 2/2008 | Tsutsui | |
| 2002/0059619 A1 | 5/2002 | Lebar | |
| 2002/0104019 A1 | 8/2002 | Chatani et al. | |
| 2002/0196940 A1 * | 12/2002 | Isaacson et al. | .............. 380/227 |
| 2003/0037335 A1 | 2/2003 | Gatto et al. | |
| 2003/0049021 A1 | 3/2003 | Kamieniecki | |
| 2003/0070052 A1 * | 4/2003 | Lai | ................. 711/167 |
| 2003/0217365 A1 | 11/2003 | Caputo | |

(Continued)

FOREIGN PATENT DOCUMENTS

WO     WO 01/10125     2/2001

*Primary Examiner* — William Trost, IV
*Assistant Examiner* — Sumaiya A Chowdhury
(74) *Attorney, Agent, or Firm* — Gazdzinski & Associates, PC

(57) ABSTRACT

Methods and apparatus for providing content to users of a network that can be selectively recorded via the user's equipment. In an exemplary embodiment, the network comprises a hybrid fiber coax (HFC) network, and on-demand (OD) sessions are used to provide high-speed download of the requested content to the users. The user's equipment (e.g., set-top box) is equipped with a high-density recording device which can both record the content onto a selected medium (e.g., DVD) and optionally provide copyright protection via one or more means such as limiting the number of copies that can be made, and/or digital watermarking. The network operator can also restrict the establishment of the on-demand sessions and/or release of the content to subscribers based on parameters including prior purchase of the content by the user, and the timing of the release of the same content via other distribution channels such as rental and retail.

32 Claims, 14 Drawing Sheets

U.S. PATENT DOCUMENTS

| | | |
|---|---|---|
| 2003/0229898 A1* | 12/2003 | Babu et al. ............ 725/87 |
| 2005/0091681 A1 | 4/2005 | Borden et al. |
| 2006/0036750 A1 | 2/2006 | Ladd |
| 2006/0047603 A1 | 3/2006 | Fontijn |
| 2006/0089911 A1 | 4/2006 | Dandekar |
| 2006/0130107 A1 | 6/2006 | Gonder |
| 2006/0130113 A1 | 6/2006 | Carlucci |
| 2006/0167808 A1 | 7/2006 | Greene |
| 2006/0173787 A1 | 8/2006 | Weber |
| 2006/0200865 A1 | 9/2006 | Leake |
| 2006/0206565 A1 | 9/2006 | Ganesan |
| 2006/0294371 A1 | 12/2006 | Fanning |

* cited by examiner (PART 1 OF 3)

(PART 2 OF 3)

(PART 3 OF 3)

| TODAY | | | | |
|---|---|---|---|---|
| 12p - 2:00 | VOD1 | MOVIE 1 | INFO BUY | CANCEL |
| 3p - 5:30 | VOD2 | MOVIE 2 | INFO BUY | CANCEL |
| 6p - 8:30 | VOD1 | MOVIE 3 | INFO BUY | CANCEL |
| 8p - 10:30 | VOD2 | MOVIE 4 | INFO BUY | CANCEL |
| TOMORROW | | | | |
| 12p - 2:00 | VOD1 | MOVIE 5 | INFO BUY | CANCEL |
| 2p - 4:30 | VOD2 | MOVIE 6 | INFO BUY | CANCEL |
| 6p - 8:30 | VOD1 | MOVIE 2 | INFO BUY | CANCEL |

FIG. 2B

TITLE: MOVIE 2
AVAILABILITY DATE: 2/1/05
CURRENT DATE: 1/29/05
VIDEO-ONLY DATE: 2/20/05

INFO

I WANT TO:
(SELECT ONE)

PRE-ORDER-RECORD DVD ($15.95)

PRE-ORDER-RECORD DVD (PC/INTERNET) ($15.95)

CANCEL

METHOD AND APPARATUS FOR NETWORK CONTENT DOWNLOAD AND RECORDING

RELATED APPLICATIONS

This application is related to commonly owned U.S. patent application Ser. No. 11/013,665 filed Dec. 15, 2004 and entitled "Method And Apparatus For High Bandwidth Data Transmission In Content-Based Networks", incorporated herein by reference in its entirety.

BACKGROUND OF THE INVENTION

1. Field of Invention

The present invention relates generally to the field of providing content over a network, and specifically in one embodiment to the configuration, delivery and recording of content via a cable television network.

2. Description of Related Technology

Cable system and other content network operators have historically been at somewhat of a competitive disadvantage to retail and rental outlets for the delivery of certain content (such as new release movie titles) due to the latency inherent in the distribution of such content over cable as compared to these other distribution channels. New release DVDs will typically be available in the rental or retail stores such as Blockbuster® or NetFlix® well in advance of the availability of the same title on a VOD or similar service. This difference in distribution timing and availability is caused in part by the lack of any effective means for distributing the desired content to cable users in a hard (e.g., disc or other tangible media) form. Rather, under the prior art, such users must make use of third party rental or retail outlets if they desire to obtain a physical copy of the content (such as for unlimited personal use).

When content is newly created value related to its release is carefully controlled through various distribution channels in an effort to maximize revenue return for the content owner. For example, a new major motion picture is released through various distribution channels according to availability windows. A typical sequence of such availability windows might be: (1) three months in commercial theater release; (2) subsequent one month release for commercial airline viewing; (3) subsequent two month release for DVD/VCR retail and rental; (4) subsequent 2 month release in cable Video-On-Demand (VOD) or cable and satellite Pay-Per-View (PPV); (5) subsequent two month release for premium cable or satellite channel distribution (e.g., HBO, Showtime, etc.); and (6) subsequent release for non-premium channel broadcast (e.g., NBC, TBS, etc.). Distribution networks such as cable operators have sought to increase the value of distribution of such content through their networks by obtaining rights to earlier windows of availability, thereby increasing potential interest by cable subscribers and buy rates of content through VOD or PPV purchases. In particular, cable operators have sought availability of major motion picture releases through VOD and PPV on the same "day and date" terms as rental or purchase through retail outlets. However, conventional business models dictate that only after the rental and retail markets have at least partly saturated can the "new" release be distributed via cable or satellite.

One possible approach for cable system operators to overcome this competitive disadvantage is to offer to sell and ship a DVD or similar medium with the purchase of a viewing opportunity (e.g., on-demand movie purchase). Hence, if a subscriber wanted to purchase the content, they could be provided with this opportunity concurrent with viewing, or via a similar mechanism. Such an approach creates a certain billing and fulfillment requirements where the service provider may be required to use one or more third party providers (e.g., an on-line entity such as Amazon.com) to process the transaction, fill the order, and/or deliver the requested medium. Furthermore, if the DVD is to be shipped ground or some other reasonably inexpensive shipping option (which would be mandated in order to keep the costs competitive with other modalities), a protracted and potentially unpredictable delivery period may occur, thereby significantly reducing customer satisfaction. Such protracted or unpredictable period may also increase the user's propensity to return the merchandise, since they now have more time to consider the merits of the purchase. Stated simply, the more "impulsive" the opportunity for commerce (especially at a comparatively low price point), the smaller the likelihood of a return or cancellation of that purchase. Under the foregoing approach, the cable service provider would also have to pay the third party for providing the required billing and/or shipping services.

Recent advances in cable network and consumer premises equipment (CPE) technology have enabled a greater capability in terms of providing cable system and other network subscribers with both high-quality video and high-speed data download that is responsive to their personal needs.

Specifically, the advent of video-on-demand (VOD) technology has greatly increased the ability of a subscriber to utilize certain content (e.g., watch a movie) delivered over their cable system on their schedule. In a typical configuration, the VOD service makes available to its users a selection of multiple video programs that they can choose from and watch over a network connection with minimum setup delay. At a high level, a VOD system consists of one or more VOD servers that pass and/or store the relevant content; one or more network connections that are used for program selection and program delivery; and CPE to receive, decode and present the video on a display unit. The content is typically distributed to the CPE over a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Many of these services, although referred to by names different than VOD, still share many of the same basic attributes including storage, network and decoder technologies.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

Similar to VOD technology, personal video recorder (PVR) functions allow the user a great degree of control over the playback and viewing of their selected content. The user can pause, fast-forward, rewind, and perform similar functions all via a unitary remote control or similar device.

However, despite their great utility, all such on-demand and PVR systems are inherently dependent on the network from the standpoint that the content is streamed from the head-end or other network node (e.g., distributed VOD server) to the subscriber's premises, and hence the subscriber must necessarily transmit commands back to the network in order to enable and utilize these functions. In contrast, the use of "hard" media such as the pre-recorded DVD allows the user the same benefits (i.e., on-demand viewing, and PVR functions), yet with no tethering to the head-end or cable network at large. As previously discussed, the most salient downside to the use of hard media is the time and effort associated with obtaining it (whether by rental or purchase), and returning it (rental only), while the most salient deficiency with VOD or similar cable distribution paradigms is the latency of the availability of new content.

Hence, it would be ideal to be able to have all of the benefits of the hard media, including: (i) the ability to impose limitations on reproduction, and provide for copyright protection/enforcement; (ii) the ability to use it an unlimited number of times for personal use (so-called "time shifting"), and (iii) transportability to other locations and media ("space shifting"), yet without the associated investments in time and effort in order to obtain the hard media in the first place, and also without the aforementioned content latency.

It would also be desirable for the subscriber or user to be able to preview the content before having to make a purchase decision, thereby allowing them to purchase only content they truly want to own. Under the rental paradigm, the user must first rent the DVD (whether by going to a rental store or via mail), view it, and then make some additional arrangement to return the rented copy and then purchase a separate (new) copy retail. Under the retail paradigm, the user must have some foreknowledge of the content and hence form their purchase decision based on another source (such as a good review from a friend or a critic).

Very recent developments in optical recording technology (specifically the density of data that can be recorded onto a single DVD or similar media) such as so-called "dual-layer" recording processes have also made consumer-based or "home" recording of lengthy content such as full-length movies onto a single recording medium viable.

Similarly, the advent of high-speed data download capability over existing cable (or satellite) infrastructure, including the VOD architectures previously described, has made the download of very large content files and associated data structures viable.

A variety of approaches to content distribution and utilization within the consumer premises are evidenced in the prior art. For example, U.S. Pat. No. 6,240,401 to Oren, et al. issued May 29, 2001 entitled "System and method for movie transaction processing" discloses a system and method for tracking and processing transactions for such purposes as creating billing record and detecting possible fraudulent activities. The system and method relates to processing transactions associated with viewing movies, e.g. a video content distributed digitally on a digital video disc (DVD) in an scrambled format, where the video content is only viewable in conjunction with the use of a specially designed and enabled player. This method of distributing and billing movie content provides an alternative to current methods such as viewing via video tapes, open format DVDs, pay-per-view, or cable service. The system and method permits a user to establish, via a single authorization, multiple access to a service during a period of time, where each event of access is not individually billed. The system and method does not create a billable charge for a user authorization if the user does not actually access the service. Furthermore, the system and method requires a user to initiate a new authorization after the original authorization has expired, in order to re-access the service. Additionally, the system and method provides one or a plurality of devices local to the user, electronically linked to a remote host, in order to create, store and transmit records of authorization and access to a remote central processor.

United States Patent Publication No. 20020104019 to Chatani, et al. published Aug. 1, 2002 entitled "Method and system for securely distributing computer software products" discloses a product distribution and payment system for limited use or otherwise restricted digital software products. Digital content data comprising a software product to be rented is made available to customers through a detachable local storage medium, such as a DVD or CD-ROM disc, or over a network connection. The product digital content is capable of being accessed and played back through a computer or game console at the customer site. The software product may comprise a limited use product that is restricted in the number of plays or duration of use. The customer is allowed to download and purchase the product using his computer or playback console. The product purchase information is encoded and transmitted to the content distributor. When the preset time or number of plays has elapsed the software program is frozen and access to the program is not allowed. In one embodiment of the present invention, a two-way, public key/private key encryption system is implemented to transmit the product and usage information between the server providing the software product and the customer computer system.

United States Patent Publication No. 20030037335 to Gatto, et al. published Feb. 20, 2003 entitled "Interactive television devices and systems" discloses an interactive TV device configured to receive and process multiple broadband input streams. The device includes functionality to perform as a Web browser, HF, cable and satellite TV receiver, a digital PVR, an interactive TV set-top box, a central processing unit and a videoconferencing device, and an integrated videoconferencing camera. The interactive TV device is configured to manage all multimedia sources similarly, whether the input is a TV channel, a Web page, or a video stream played back from a data carrier such as a DVD, for example. The device is also configured to enable a user to watch and record a plurality of video streams simultaneously and to display them on four independently manageable quarter screen segments.

United States Patent Publication No. 20030049021 to Kamieniecki, published Mar. 13, 2003 and entitled "Apparatus for monitoring of DVD/CD usage and targeted DVD/CD sales utilizing a set top with DVD/CD capability" discloses a subscriber is provided with a combination set-top and DVD/CD player. When the subscriber loads and plays a DVD/CD player, the set top obtains and stores data relating to the DVD/CD being played. This data, accumulated over time, creates a subscriber profile. A head-end periodically acquires the stored profile data, compares it with a large DVD/CD database to develop a list of DVDs/CDs whose genre/artists are related to the profile. This list is transmitted to the subscriber's set-top to provide suggested titles/artists to the subscriber for possible purchase. Purchase data of the user are employed to create and store a purchase profile at the head-end. The ordered DVDs/CDs are sent by mail and are billed together with an invoice for other cable services The set-top may be provided with a decrypter and writeable DVD/CD drive to receive and record encrypted premium content from the head-end, avoiding the need to ship DVDs/CDs and the attendant costs.

A number of commercial products provides ostensibly "new" content to the user, yet do not provide the ability to record a hard media. For example, The ABC/Disney Movie-Beam system receiver comes with a predetermined number (i.e., 100) movies already stored inside. Each week, up to 10 movies are replaced with new movies, thereby making this approach somewhat similar to the Netflix approach of a "rolling" population of available content. Similarly, Seachange provides a consumer product that gives a DVD-like experience; however, this is run from the network head-end, and is not downloaded to the set top.

While some of the foregoing approaches provide hard media to a user or subscriber, none of the foregoing solutions provide for timely high-speed delivery of very large data files via a secure network, or high-density recording of content once the content is delivered. Furthermore, none of the foregoing solutions add the capability for digital rights management and control as part of the distribution and recording process, including especially tying the viewing and purchase decisions together to form a cohesive and controllable business model that does not detract from the value the content owner extracts from the retail and rental distribution channels.

Hence, there is a salient need for improved distribution apparatus and methods which allow a cable subscriber or other network user to obtain a tangible copy of their desired content in a prompt and effortless manner, using extant network infrastructure (e.g., VOD infrastructure and interfaces) and with the option of implementing digital rights management data or other content protection mechanisms. Such apparatus and methods would also optionally tie the creation of the tangible copy to the viewing of the content, thereby providing content creators and distributors with a viable business model which would not usurp rental and retail profits.

SUMMARY OF THE INVENTION

The present invention satisfies the foregoing needs by providing improved apparatus and methods for the download and optional recording of content over a network.

In a first aspect of the invention, an improved method of providing content delivery over a network is disclosed. In one embodiment, existing network data download infrastructure (e.g., on-demand infrastructure) is used, and the method comprises: causing the content to be transmitted from a server entity associated with the infrastructure to consumer premises equipment (CPE) operatively coupled to the network; receiving and storing the transmitted content at the CPE; and recording at least portions of the content onto a fixed medium using the CPE. The server entity may comprise, e.g., a VOD server adapted for high-speed data download via sessions established between the server and the CPE. Use of the extant cable network infrastructure, as well as encryption and other optional security mechanism (such as user/device authentication) provides an added level of physical security against surreptitious theft of and reproduction of the downloaded content.

In a second aspect of the invention, improved network apparatus adapted to obtain and record content, is disclosed. In one embodiment, the apparatus comprises CPE having: a processor; a storage device in data communication with the processor; a network interface in data communication with the processor; and a recording device in data communication with at least one of the processor and storage device, the recording device being adapted to record at least portions of the content received via the interface onto a recording medium. The network apparatus may comprise, for example, a digital set-top box (DSTB) having a DVD recording device adapted for dual-layer optical recording. A computer program resident on the DSTB (or downloaded from the network) is used to manage content download and recording functions, as well as optional copyright management and protection.

In a third aspect of the invention, a method of doing business is disclosed. In one embodiment, the method is employed within the context of providing protected content (e.g., copyrighted movies, music, games, etc.) via a cable television network, and the method comprises: making the protected content available for download to a plurality of subscribers of a network; selectively transmitting the content to at least one of the plurality of subscribers; and enabling the at least one subscriber to record the content onto a recording medium, the subscriber retaining ownership of the recorded medium. The medium may comprise, e.g., an optical DVD that can be written by the subscriber's own CPE. When coupled with an on-demand delivery modality, this method of the invention provides the subscriber with the ability to receive new-release content (contemporaneous with its availability in retail or rental outlets), and selectively both view and record the content. The purchase of the video content and hard medium can also be coupled such that the viewer cannot receive and view (at least any substantial portion of) the content without committing to the purchase. The price to the consumer for the on-demand viewing and "purchase" combination may be similar to the retail price of a DVD purchased in a store, and enabled during the retail/rental release window, such that the value extracted by the content owner during the retail/rental release window is not diminished. In a fourth aspect of the invention, a storage device is disclosed. In one embodiment, the storage device is adapted to carry protected content, and is produced according to the method comprising: providing a medium adapted to receive a plurality of data; receiving content to be recorded onto the medium at a recording device from a cable network; and recording the content onto the medium using the device. The exemplary medium comprises an optical recording medium (e.g., optical DVD) having multiple layers, and the act of recording comprises permanently modifying at least one of the physical and chemical structure of each of the multiple layers such that the modified areas have optical properties different than those of their unmodified surroundings. Use of such multi-layer media allows for data densities sufficiently high to support recording of full-length motion pictures (with any other related content such as "extras") on a single DVD. The recording process further optionally comprises including copyright management data (e.g., watermarking/steganographic data, or other) with the content, and recording both the content and the management data onto the medium.

In a fifth aspect of the invention, improved storage apparatus is disclosed. In one embodiment, the storage apparatus comprises a hard drive or memory device, such as that present in a DSTB or other CPE, adapted to store a plurality of data comprising a computer program. The computer program stored on the medium is adapted to run on a processor of the DSTB/CPE connected to a cable network, and further: receive data from the network; check the received data for errors; and record the received data onto a recording medium using a recording device (e.g., laser-driven dual-layer DVD burner) associated with the network device. In one variant, the computer program is distributed with the DSTB when sold/installed. In another variant, the computer program is downloaded to the subscriber's DSTB over the network as part of a service package.

BRIEF DESCRIPTION OF THE DRAWINGS

FIG. 2b is a graphical representation of an exemplary embodiment of a user interface (on-screen menu) used to view various content titles for purchase and/or viewing.

FIG. 2c is a graphical representation of an exemplary embodiment of a user interface (on-screen menu) used to select individual purchase/viewing options for a currently-unavailable title selected via the menu of FIG. 2b.

DETAILED DESCRIPTION OF THE INVENTION

Figure 1:
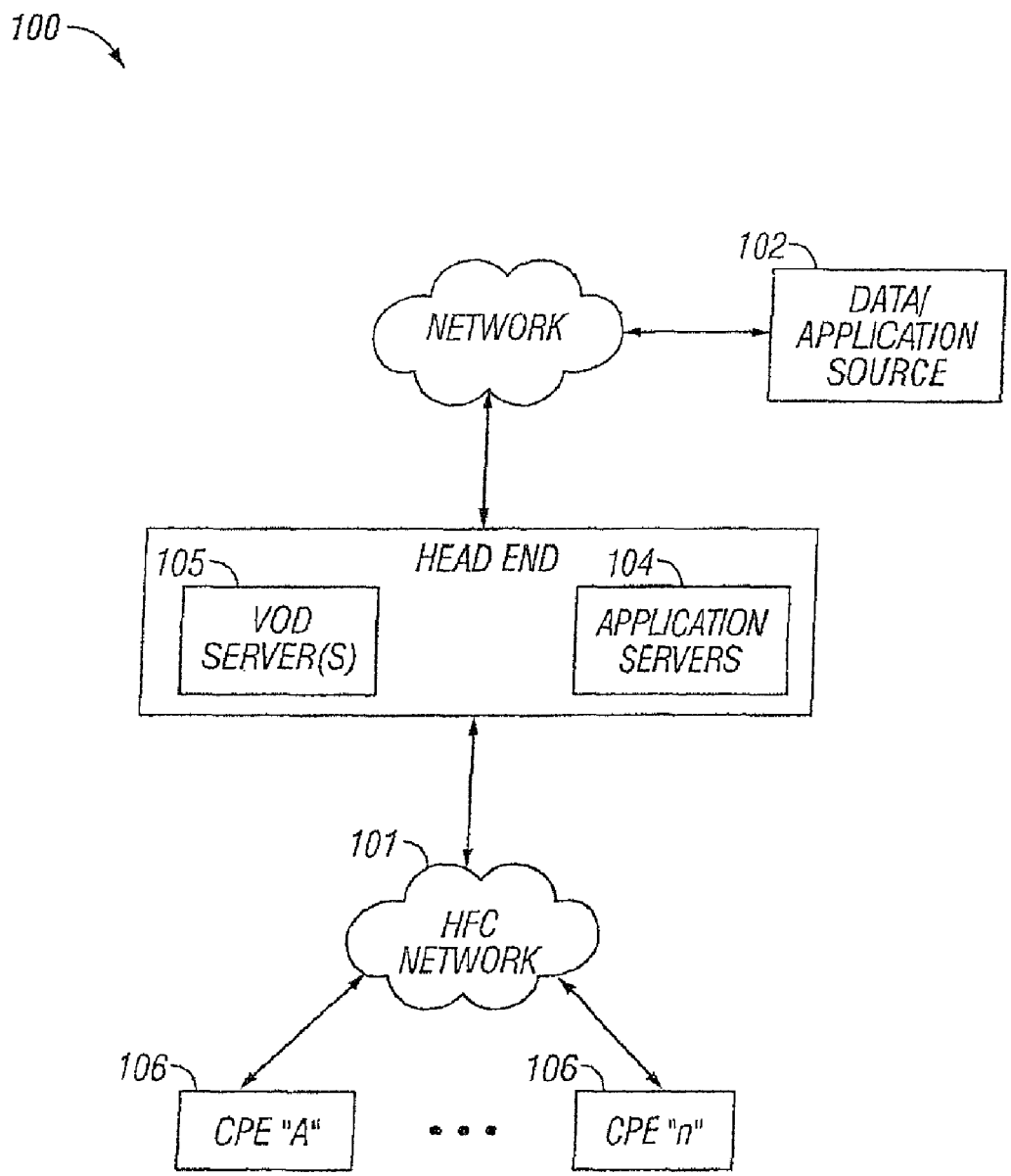
FIG. 1 is a functional block diagram illustrating an exemplary HFC network configuration useful with the present invention.

Reference is now made to the drawings wherein like numerals refer to like parts throughout.

As used herein, the term "QAM" refers to modulation schemes used for sending signals over coaxial cable networks. Such modulation scheme might use any constellation level (e.g. QAM16, QAM64, QAM256 etc.) depending on details of a cable network.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the term "MSO" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli or MPx 220 devices, J2ME equipped devices, cellular telephones, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the term "package" refers to an arrangement of computer-readable data files or other data structures assembled to comply with a specific syntax or protocol.

As used herein, the term "provisioning" refers generally to a process whereby a package, content title or other information is provided to a service (such as on-demand download service) so that the information is integrated with other functions and software modules within the service.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form, which is adapted to provide data, files, applications, content, or other services to one or more other devices or entities on a computer network.

As used herein, the term "recording medium" refers to any material, component, collection of components or device adapted to store information in a substantially permanent or semi-permanent state. Exemplars of recording media include, without limitation, magnetic media, integrated circuits (e.g., RAM or ROM), optical media, chemical media, and atomic- and subatomic-level storage structures (e.g., crystalline structures, quantum or spin states, etc.).

As used herein, the term "purchase" shall mean without limitation any sale, agreement for sale, transfer of funds, promise to transfer funds, barter arrangement, promotional or incentive agreement or arrangement, or other relationship wherein consideration of any kind is exchanged between two or more parties (or their proxies).

Overview

The present invention comprises improved methods and apparatus for the timely provision, selection, download and recording of content or other data via a network (such as a cable television network).

In one exemplary embodiment, the present invention utilizes extant high-speed network download and data recording technologies to provide a here-to-fore unavailable capability to the network subscriber or other user; i.e., timely and rapid download of new content such as a new-release movie or game, along with the ability to promptly reduce the downloaded content onto a desired medium (e.g., DVD). The provision of the new content for viewing can also be tied to a purchase of the content (or other commerce-based event), such as where the content is only delivered after the user agrees to purchase the content and record it onto a DVD or similar media. This capability provides a number of distinct advantages, including, inter alia: (i) the ability to sell the subscriber a movie or other title in an earlier window than would otherwise be available under prior art network content distribution paradigms; (ii) the ability to download a disk image to the customer's DVR hard disk or other storage device at a very high speed; and (iii) the customer's ability to run the downloaded content directly from their hard disk and also produce a fixed or erasable medium copy (e.g., DVD, memory stick, USB key, etc.), as desired.

Furthermore, by using the aforementioned "tying" of the DVD purchase and viewing of the content, content providers such as studios or networks can be assured of no diminution of their rental and retail channels. This approach provides a strong differentiation over other physical distribution channels (e.g., rental and retail), since viewers can now purchase, download and record their selected content without the attendant cost and effort of renting/return or retail purchase. Also, delivery and controlled distribution (i.e., recording) over a cable or similar network can provide certain security benefits as compared to other electronic network distribution channels (such as the Internet), which are inherently untrusted and hence provide a significant risk of theft or unauthorized "ripping" or peer-sharing of content to the content provider without additional security measures. Copyright or other intellectual property rights management mechanisms can also be readily implemented and enforced using the approach of the present invention.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures where bandwidth allocation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels.

Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband (UWB) systems. For example, in one variant of the invention, high-bandwidth UWB signals imposed atop the traditional QAMs of the cable network are used to provide a high-speed data download capability for the content to be recorded, in parallel with the existing QAM bandwidth used for normal transport stream delivery.

System Architecture

FIG. 1 illustrates a typical content-based network configuration with which the media download and recording apparatus and methodology of the present invention may be used. The various components of the network 100 include (i) one or more data and application origination points 102; (ii) one or more application distribution servers 104; (iii) one or more VOD servers 105, and (iv) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The application origination point 102 comprises any medium that allows an application (such as a data download application or VOD-based application) to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 a computer system where on-demand content, as well as data can be received from one or more data sources 102 and enter the network system. These sources may generate the content/data locally, or alternatively act as a gateway or intermediary from a distant source. The VOD server 105 includes the Session Resource Manager (SRM) functionality, and asks the Digital Network Control System (DNCS) for resources. The DNCS responds with negative or positive response to the request, and the VOD server implements the appropriate resource allocation logic.

The CPE 106 includes any equipment in the "customers' premises" (or other locations, whether local or remote to the distribution server 104) that can be accessed by a distribution server 104. Such CPEs 106 comprise processors and associated computer memory (and optionally mass storage) adapted to store and run the downloaded or resident application, as well as receive and store the streamed content and/or data. In the present context, at least a portion of the CPE application(s) necessary to facilitate high-speed content download (and recording) can itself be downloaded to the CPE 106, wherein the latter executes the downloaded application(s)/components in order to enable the CPE to receive the high-speed (content) data and to record it onto the selected recording medium such as DVD. It will be recognized, however, that the application(s) may also be resident on the CPE before download, or received from another source (such as a third party Internet site, wireless interface, via CD-ROM, etc.).

Figure 1A:
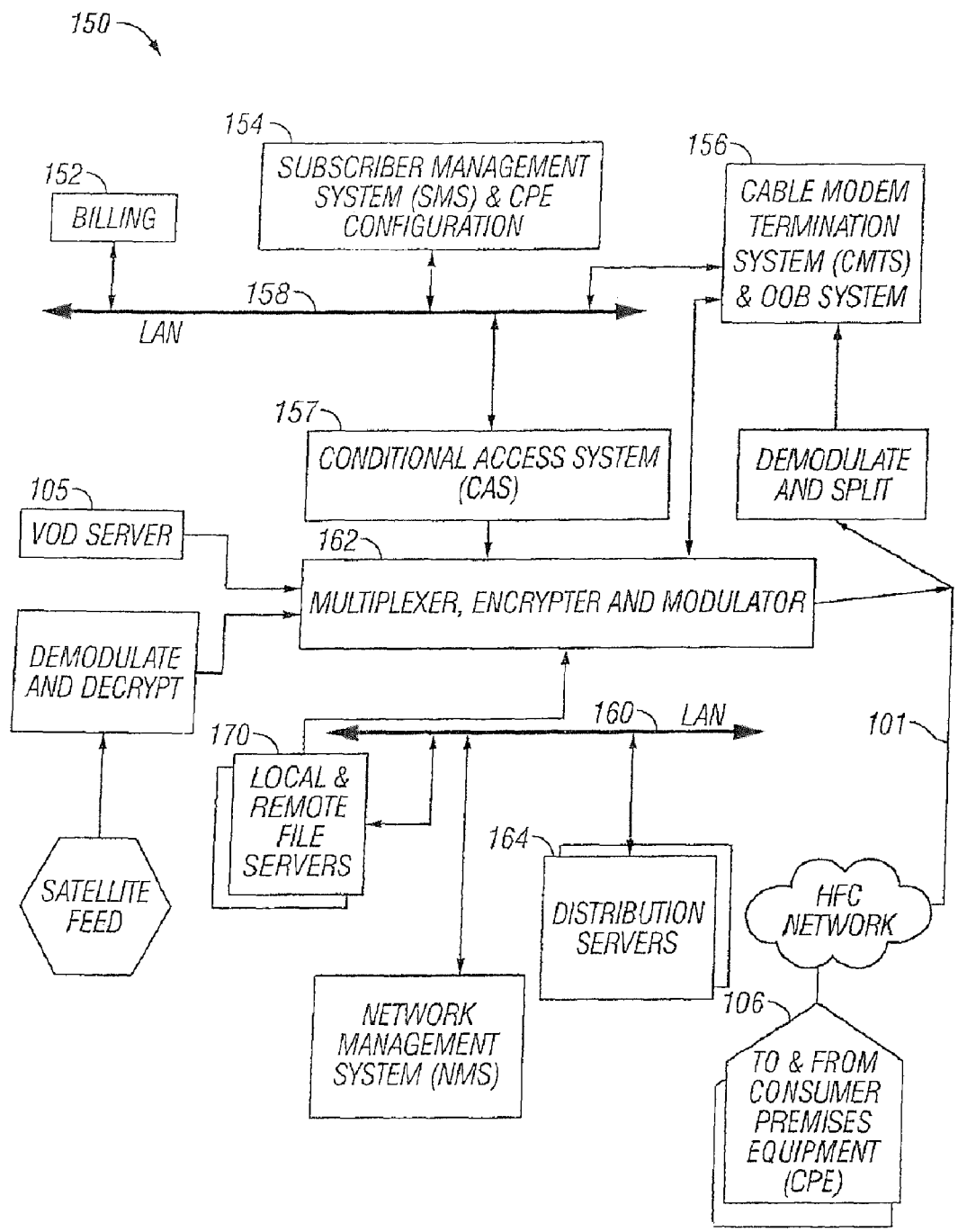
FIG. 1a is a functional block diagram illustrating one exemplary head-end configuration of an HFC network useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel associated with the relevant service group. As will be discussed in greater detail subsequently herein with respect to the exemplary embodiment, high-speed content/data download is provided over in-band channels, while associated metadata files or control and signaling data may provided either in-band or out-of-band (OOB). To communicate with the head-end, the CPE 106 uses the OOB or DOCSIS channels and associated protocols. The OCAP 1.0 specification provides for networking protocols both downstream and upstream.

It will also be recognized that the multiple servers (OD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned United States Patent Application Publication No. 20020059619 to Lebar published May 16, 2002 and entitled "Hybrid central/distributed VOD system with tiered content structure" which is incorporated herein by reference in its entirety.

Specifically, a hybrid central/distributed and tiered video on demand (VOD) service network with tiered content structure is disclosed. In particular, the system uses media servers located in both the head-end and hub stations. Set-top boxes generally would be supplied VOD services from the high-demand content media (and data) servers located in the hub station nearest to the user. The central media server located in the head-end would be used as an installed backup to the hub media servers; as the primary source for lower demand VOD services and as the source of the real time, centrally encoded programs with PVR (personal video recorder) capabilities. By distributing the servers to the hub stations, the size of the fiber transport network associated with delivering VOD services from the central head-end media server is reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network and the reduced storage capacity requirements for hub servers.

Many other permutations of the foregoing system components and communication methods may also be used consistent with the present invention, as will be recognized by those of ordinary skill in the field.

Methods

Figure 2:
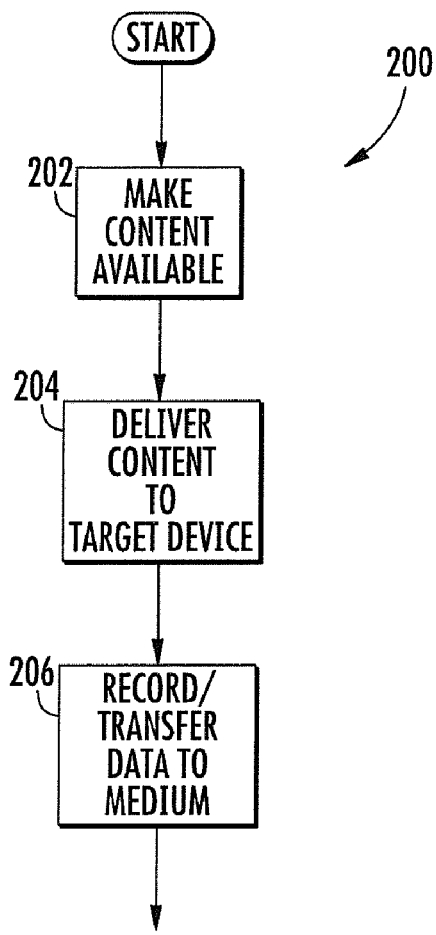
FIG. 2 is a logical flowchart illustrating the generalized download and recording methodology according to the present invention.

Referring now to FIG. 2, an exemplary embodiment of the method of providing content over a network is described.

In a first step 202 of the method 200, the desired content is made available for download via the selected communication channel. As described in greater detail subsequently herein, this may be in response to a user request for the content instigated from the CPE 106, or may be as a result of action taken at the head-end or other network node (including a third party content server), such as where the delivery of content is conducted according to a predetermined schedule.

Next, per step 204, the content is delivered to the target device (e.g., customer CPE 106) via the communication channel. Upon receipt, the target device stores the received data (at least transiently) per step 206.

Lastly, the stored data is recorded or transferred onto the desired medium per step 208. This recording or transfer may take place during the receiving process; e.g., where the received data is stored and then immediately recorded onto the medium in a continuous fashion before the entire download is completed.

Figure 2A:
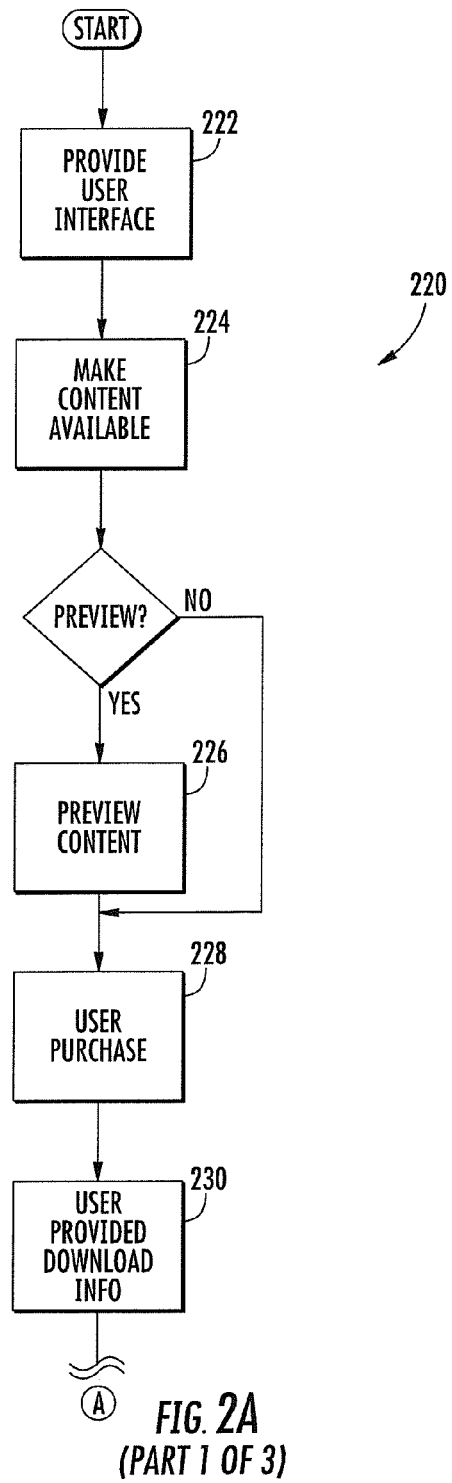
FIG. 2a is a logical flowchart illustrating a first embodiment of the methodology of FIG. 2, adapted for a cable television network and consumer premises equipment (CPE).
Figure 2A:
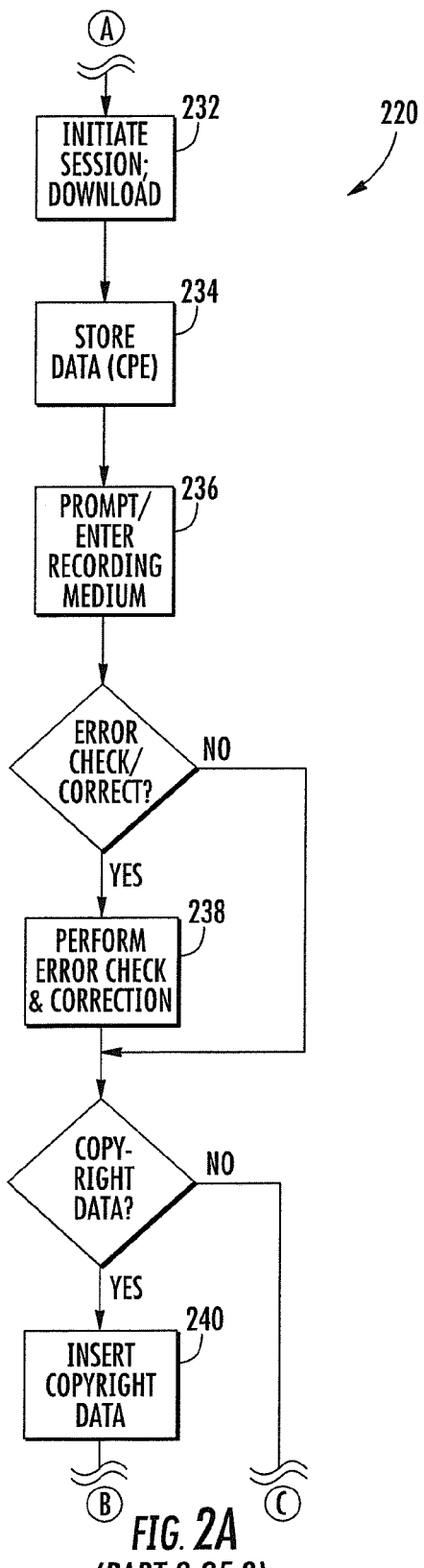
Figure 2A:
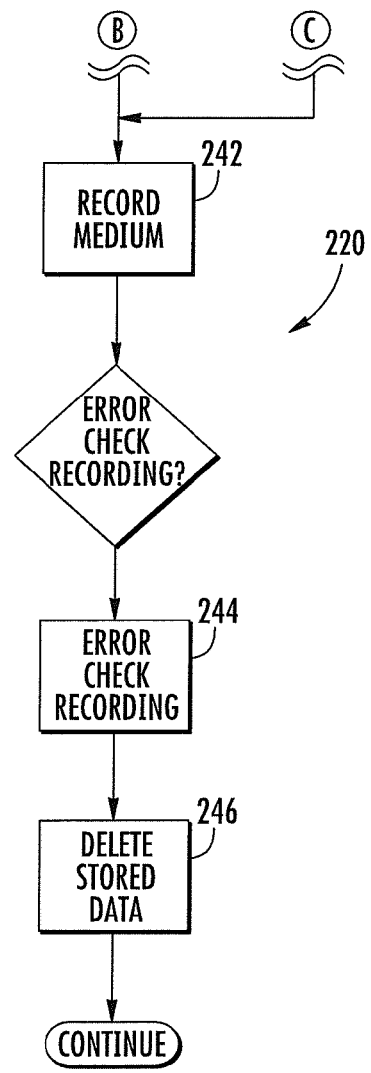

Referring now to FIG. 2a, one exemplary embodiment of the method 200 of FIG. 2 is described in detail. In this embodiment, the data download functionality described in co-owned and co-pending U.S. patent application Ser. No. 11/013,665 filed Dec. 15, 2004 and entitled "Method And Apparatus For High Bandwidth Data Transmission In Content-Based Networks", incorporated herein by reference in its entirety, is used to provide a high-speed content or data download capability using a session-based VOD-like approach, although other approaches may be used with equal success. Use of such VOD-like approach advantageously allows the present invention to be implemented with little if any modification to the network infrastructure.

It will be appreciated that while the following embodiment is described in terms of an on-demand (OD) "session" based model, the present invention is equally adapted to non-OD models such as data/content download via a cable modem, digital video recorder (DVR) type function, out-of-band (OOB) communications channel, or the like, the VOD exemplar being merely illustrative of the broader principles. For example, one alternative is to use a cable (e.g., DOCSIS) modem or high-speed data (HSD) link of the type well known in the networking arts can be used to download the content or data. A high data-bandwidth wireless channel such as a broadband satellite or millimeter wave channel, can also be utilized. Portions of the downloaded content (or any associated metadata or other related data) can also be transmitted via separate homogeneous or heterogeneous channels if desired. Myriad different approaches can be used with the present invention, the latter being functionally agnostic to the modality used for content/data delivery.

The method 220 comprises first providing an interface with which the user (e.g., subscriber) can interact per step 222. In the exemplary embodiment, this interface comprises a menu-driven or GUI application displayed to the user via their display device, although other approaches (including interface via a connected PC or wireless device such as 3G UMTS smartphone) may be used with equal success. This menu/GUI application allows the user to, e.g., purchase a new release movie (for VOD) enabled by the purchase of the DVD, after (or even before) the content is made available per step 224. For example, in one embodiment, the user can "pre-purchase" the content before its release date, and then simply be provided the opportunity to later download it one or after the release date.

FIG. 2b shows an exemplary embodiment of a user interface (on-screen menu) 250 used to view various content titles for purchase and/or viewing. After selecting their desired choice, the user then orders the selected product per step 228. This may be accomplished using the menus structures described below with respect to FIGS. 2c-2e, or by the user simply selecting a "confirm" function or menu option which verifies their method of payment, quantity desired, and so forth.

In the exemplary embodiment of the invention, the menu structures are dynamic and hence change as a function of the relationship of the current date, "availability date", and a "video-only" date. FIG. 2c shows one exemplary embodiment of a menu 252 used to select individual purchase/viewing options for a currently-unavailable title selected via the menu of FIG. 2b. As shown in the example of FIG. 2c, the current date is less than (earlier) than both the availability and video-only dates, and hence the selected content can be neither currently downloaded or viewed. Rather, the user is given only the options of pre-ordering the content for purchase (upon reaching the availability date or later) via direct download to their CPE 106 and its DVD burner, or alternatively to another modality such as a PC or other network device for storage and recording there.

Figure 2D:
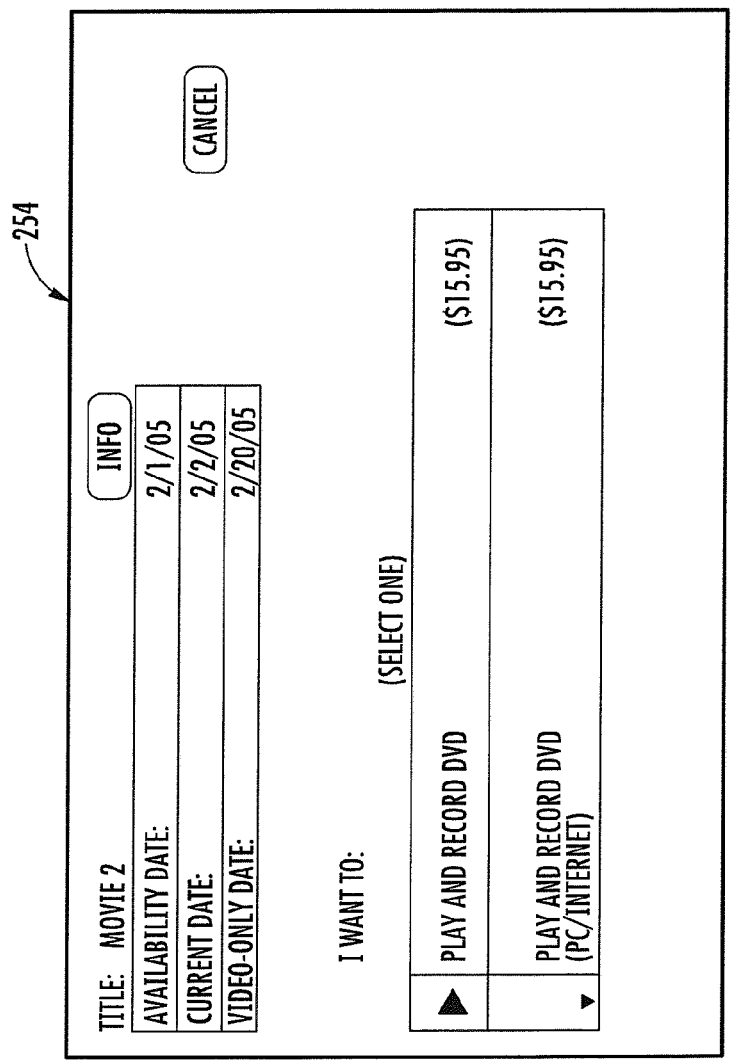
FIG. 2d is a graphical representation of an exemplary embodiment of a user interface (on-screen menu) used to select individual purchase options for a title that is available for media purchase (and associated viewing) only.
Figure 2E:
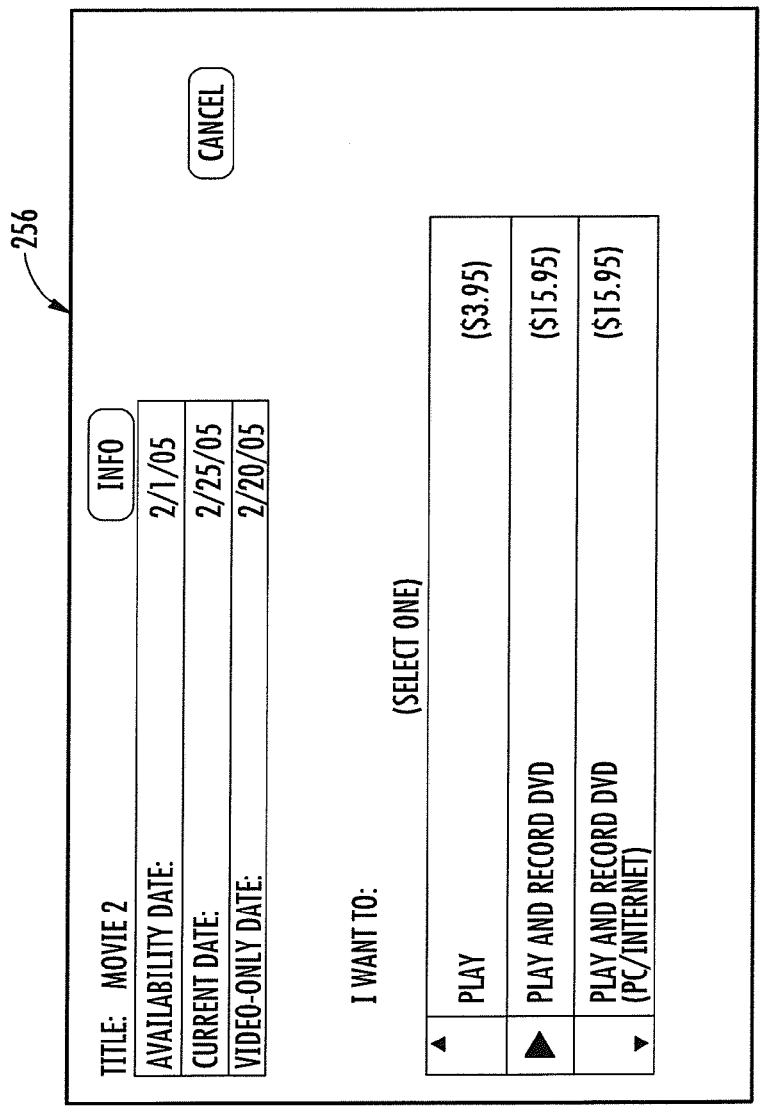
FIG. 2e is a graphical representation of an exemplary embodiment of a user interface (on-screen menu) used to select individual purchase or viewing options for a title available for both media purchase, and separate viewing (i.e., without media purchase).

FIG. 2d illustrates an exemplary menu 254 used to select individual purchase options for a content title that is available for media purchase (and associated viewing) only. In this instance, the selected title is available for viewing coupled with a purchase only. No viewing of the content without a corresponding purchase is permitted until the "video-only" date is reached. When this video-only date is reached, the user's menu 256 again changes, now offering all options to the user (including purchase of a one-time viewing only for a lesser price).

Alternatively (or in conjunction), a "one button" approach, such as a select-to-order icon, can be employed. In such a case, various menu steps are obviated, thereby making the selection and payment process easier and more enjoyable for the user.

In another variant, most or all of the ordering functions are disposed on a common menu. For example, the menu of FIG. 2b can be provided with more soft function keys for each title, with the generation and display of these keys being controlled according to the aforementioned date logic. Hence, when the current date exceeds both the purchase availability and video-only dates, a full set of soft function keys is presented to the user, each of which can be used to invoke the desired function (without further action by the user if the aforementioned "one button" approach is used). Alternatively, lesser soft function keys can be displayed at current date values which are before the purchase availability and/or video-only dates, effectively limiting the user's choices akin to those of the menus of FIGS. 2c-2e.

Advantageously, the present invention may be used consistent with any number of different payment options, including for example: (i) payment via billing to the user's existing cable subscription (whether based on a monthly fee, a "per-download" paradigm, trial basis, or other), (ii) direct payment via a credit/debit card (e.g., wherein the user enters their credit/debit card directly, or has it stored in a secured location for easy recall), or (iii) via an electronic payment service such as "PayPal" or the like. The selection may also be made as part of a promotion or in exchange for services by the user, such as where the user agrees to submit a review of the film (or the service itself) in exchange for a free DVD. Models based on user discount or promotional codes are also envisaged.

It will be recognized that a preview or other sampling of the target content (step 226) may also be employed as part of the present method 220. For example, the user may be given an opportunity to watch a short trailer, or selected vignettes from the content, before having to commit to a purchase. They may also optionally be given the opportunity to consult rating (e.g., user ratings) data or other sources of information which may help form the purchase decision.

Per step 230, the user is then notified that his/her selected content or data will be available for download once the transaction is authorized. The user may also be provided a limited window for download and/or "burning" their physical copy of the DVD/CD-ROM if desired, in order to further mitigate attempts to surreptitiously use or distribute the downloaded content. For example, in one variant of the invention, the user is limited to one (1) "burn" of a DVD occurring substantially contemporaneous with their download. As part of this notification, the user may also optionally be provided any cryptographic data (e.g., key seeds, public/private key pairs, challenges/responses, etc.) required to complete the download and decrypt the content if encrypted. This cryptographic data may also be sent via a separate data channel (e.g., OOB or IP) in order to minimize the chance of interception of both the content and the crypto by a single entity.

Per step 232, the relevant transport modality is initiated. In the illustrated embodiment, this modality comprises the initiation of a VOD session of the type well known in the art, wherein the commands delivered to the relevant VOD network server or other device instantiate a session and transport stream from the server (or its proxy) to the user's CPE 106. However, it will be apparent to those of ordinary skill that other modalities may be used consistent with the invention, including without limitation a user session based on the Session Initiation Protocol (SIP), whether with the same or another bearer medium such as a non-VOD approach, via a WAP Wireless Session Protocol (WSP) session disposed on a handheld device, and so forth. It is noted that in such SIP or WAP variants, the initiating device need not necessarily be the target device (e.g., DSTB with DVD recorder) to which the content is streamed. Rather, the SIP or WAP-enabled device can act as a session proxy for the DSTB or other target CPE, such as where the user utilizes their SIP-enabled PDA to communicate with a head-end or other content-providing network entity to establish the download session. The VOD session is selected in the illustrated embodiment, however, since it advantageously comprises an already-installed service base thereby requiring little or no modification or infrastructure upgrade to implement the download and recording methodology of the present invention.

The aforementioned VOD or other session per step 232 may be initiated promptly (e.g., automatically upon authorization of the transaction), or alternatively at another time selected by either the MSO or the user (such as, e.g., at a pre-determined day or date when the content is to be released). Similarly, if the target CPE (e.g., DSTB) has multiple RF tuners and one is available, a secure data/content download can be initiated immediately, or as soon as a tuner becomes available when all are initially in use. Likewise, if the CPE has a single tuner, the secure data/content download is initiated when that single tuner is free. Downloads can also occur piecemeal, such as where the content is fragmented into two or more components which are downloaded at different times and then effectively re-assembled at the CPE. The present invention also contemplates the ability to "store" a plurality of content downloads at a given location, such as within a secured storage area of the VOD server, such that the user can download several items concurrently or as a package at their leisure.

The foregoing download logic can also be masked with other requirements if desired, such as where both a free tuner and the download start time falling within a prescribed temporal window are required (i.e., the download is valid only for a certain "aging" period), or where the user acknowledges a splash screen or comparable mechanism acknowledging the copyright of the content to be downloaded, and the restrictions on its use. Masking may also be based on network status or bandwidth availability, such as where the session will not be instantiated until sufficient bandwidth is available to provide a sufficiently high assurance of completing the download with a minimal amount of latency (e.g., for very large downloads). Myriad other functional masks of the type well known in the networking arts may be used as well consistent with the invention.

During download, the CPE 106 or other download device receives and stores (at least transiently) the downloaded data/content per step 234. This can be accomplished for example using the hard drive (e.g., SATA or Ultra-ATA drive) of the CPE 106, or alternatively using a sufficiently sized memory (e.g., RAM) or other such IC storage device. With the advent of multi-GB RAM arrays now available for PC's and other computing or electronic devices, RAM provides a realistic alternative to more traditional mass storage devices. Such memory may also comprise a FIFO arrangement, wherein the "burn" of the recording media is accomplished concurrently with (albeit somewhat latent to) the download of the data/content.

Next, per step 236, the user is prompted to enter their desired recording medium into the relevant recording device. In the exemplary embodiment (described in greater detail subsequently herein with respect to FIG. 4), the CPE 106 contains a DVD recording unit ("burner") of the type well known in the art. This recording unit is configured to provide sufficient image density (e.g., "dual-layer") to permit an entire movie to be stored on a single DVD, although this is not a requirement where other technologies, such as single-layer recording, provide sufficient data recording capability for the intended download. Different recording paradigms may also be used dependent on the requirements of a given application, such as where a short download (e.g., music video, tutorial, or promotional content) can utilize a single-layer process, yet the dual-layer process is selectively utilized for longer content such as movies. The recording device may also be configured to automatically determine the proper recording medium to use.

Furthermore, the recording device may be located within another device which is in data communication with the platform that receives and stores the downloaded data (step 234). As used herein, the term "data communication" means any mechanism by which data can be transferred from one device to the other. For example, an exemplary CPE 106 may comprise an IEEE-1394 "FireWire" interface which permits data to be streamed at high speed (e.g., 800 Mbps or greater) to a connected device. Alternatively, a wireless interface may be used, such as an IEEE-802.15 PAN ultrawideband (UWB) air interface of either DSSS or OFDM modulation, or alternatively another type of modulation such as TM-UWB. As is well known, UWB systems have great data bandwidth (many in excess of 1 Gbps) due to their frequency or code spread, while also advantageously utilizing very low EIRP (radiated power) profiles.

As yet another alternative, a physically transportable and rewritable medium may be used, such as a removable memory "stick" of sufficient capacity, wherein the CPE 106 or other receiving device includes a port for the removable storage device. The user then downloads the data as previously described (i.e., either directly onto the memory stick, or into an intermediary storage device which then writes the data onto the memory stick), removes the stick from the CPE 106, and then inserts it into another stick-capable device which may be either proximate or remote to the CPE. In one variant, a USB key of the type well known in the computer arts is used to store up to several gigabytes of data for transfer and/or playback by another remote device such as the user's laptop or notebook computer. These devices now also ubiquitously contain encryption and security features, and can be configured to allow only one "read" of the data by an external device in order to frustrate surreptitious copying and distribution of the content.

The downloaded data or content is also optionally checked for accuracy and repaired if required, such as via cyclic redundancy check (CRC), Reed Solomon encoding, or other such error detection/correction algorithms) per step 238. This step may be performed at literally any time including during download (e.g., on a packet-by-packet basis), after the entirety of the download is complete and before "burning" of the DVD/ROM, during burning of the DVD/ROM (e.g., before a given byte of data is submitted to the software process within the burner to be placed onto the medium), or even after the DVD/ROM has been burned (e.g., as a quality assurance check of the final product).

It will also be recognized that the transmission of the data may also employ such error detection/correction functions, such as where a cable or satellite network uses turbo codes or Viterbi code/decode for FEC of the data streamed over the physical layer.

Next, per step 242, the selected medium is recorded, such as where the user "burns" a DVD or CD-ROM using the downloaded data/content. The mechanisms for accomplishing such recording are well known in the art, and accordingly not described further herein. For example, in one variant of the invention, a dual-layer "DVD+R" system (also sometimes referred to as "DVD9") such as that manufactured by Royal Philips Electronics, NV, is utilized. This particular Philips technology utilizes two thin embedded organic dye films for data storage separated by a spacer layer. Heating with a focused laser beam irreversibly modifies the physical and chemical structure of each layer such that the modified areas have different optical properties than those of their unmodified surroundings. This causes a variation in reflectivity as the disc rotates to provide a read-out signal, as with commercially pressed read-only discs. As an alternative, so-called "blue laser" technologies such as Blu-Ray may be used to provide the desired density of information storage. Furthermore, it is envisaged that multi-layer recording approaches (e.g., three or more) may be used to yet further increase storage density if desired. Myriad other alternatives, including for example quantum-level data storage devices, are useful with the present invention as well.

As part of this step 242 (or other appropriate stages of the method 220), various other types of functionalities may be included within the data/content and/or recording medium. For example, in one embodiment, digital copyright data is included within the recorded data/content (step 240), such as well-known digital watermarking data of the type authorized under the United States Digital Millenium Copyright Act (DMCA). For example, Digimarc®, SysCoP™, EIKONAmark™, and other similar commercially available watermarking approaches can be used. Media rights management systems such as the Microsoft Windows® Media Digital Rights Manager (DRM), may be used as well. Various types of steganographic approaches may also be employed consistent with the invention in order to enforce copyright and provide the copyright owner with accountability and/or traceability of reproduced versions of their copyrighted material. If desired, these approaches can be readily coded into the software or firmware of the recording device such that the inclusion of this data is completely transparent to the user, and does not require any user or MSO/content provider intervention.

In another embodiment, the recording medium itself is configured to provide copyright management or limited use functions, such as where a "limited life" DVD or CD-ROM blank is used. As is well known, such devices are self-destructive such that the device is functional for only a finite time period or number of plays. One mechanism for accomplishing this functionality comprises utilizing materials within the medium that degrade after a given number of exposures to the interrogating laser light on a playback, although any number of other approaches can be used as well. Furthermore, the CPE 106 and its recording device can be configured, for example, to detect and accept only such limited life media for recording, thereby ensuring that the user does not record the content onto an unlimited-lifetime medium.

In another approach, the MSO or content provider can provide the user with a number of pre-formatted blanks (such as via mail or ground shipping) that are digitally encoded so as to frustrate use within any CPE other than those of a specific user. For example, the blanks can each be pre-coded with a user's individual code or key, that must be matched to a counterpart key stored in their CPE (or alternatively at a distant node on the network, such as a security management server) before the recording device on the CPE 106 is "unlocked" and allowed to record the content. Hence, under this paradigm, the physical security aspects of the CPE 106 and recording medium may be used alone to limit access to the content, as opposed to embedding copyright protection data within the content itself. It will be appreciated, however, that both techniques (as well as others) may be used concurrently consistent with the present invention in a "layered" security approach.

It will also be appreciated that the recording step may be initiated automatically upon satisfying all conditions (e.g., completion of the download and acknowledgement by the recording device that suitable media is present therein), or made user-controllable. For example, in one variant of the method 220, the user is prompted upon completion of the download as to whether they wish to presently record the data or content onto their chosen medium. This may provide the basis for, inter alia, a "return" policy of sorts, wherein the user at that stage can cancel the transaction and any billing associated therewith by selecting not to record the medium. In effect, the downloaded content is kept in a physically and/or electrically secure holding area within the user's domain while they decide whether or not to irrevocably purchase the content.

This functionality can be achieved by, e.g., encoding or encrypting the downloaded content, such as via a public/private key system, where in the user's CPE is only provided the necessary private key for decryption upon affirmatively selecting "yes" on the recording decision, such selection also causing the billing module within the head-end or other location to charge the user's account. Another approach may comprise lacing the downloaded content with disruptive noise or similar data such that the picture rendered by playing the content is garbled or unusable, with such data only being removed upon (i) payment by the user, and/or (ii) use of the appropriate cryptographic or authentication data (or even a SIM card or similar device) to "unlock" the decoding algorithm so that removal of the disruptive data is enabled. Myriad other approaches to securing data compatible with the present invention are well known to those of ordinary skill, and hence not described further herein.

Lastly, per step 246, the downloaded data is removed from the storage medium (e.g., hard drive) so as to (i) make room for additional data or content, and (ii) minimize the opportunity for any surreptitious use of the downloaded data, such as mass-reproduction of the aforementioned DVD/CD-ROMs. This deletion can be accomplished automatically without any user intervention (or more importantly any opportunity for user intervention), or with user action/authorization, depending on the application and functionality desired by the MSO or other content provider. Such removal may also be on a finite-lifetime basis, such as where the user is provided a period of time to consider their purchase and/or view trailers, and if no purchase decision is made, the content is automatically wiped from the secure storage location. The recorded medium may also be error checked or otherwise verified (step 244) if desired before the content is deleted, so as to give the CPE 106 a second chance at recording if the first recording was defective for any reason (or alternatively according to a limited set of error codes or conditions so as to frustrate surreptitious attempts at bypassing any limitations on the number of recordings).

It will be appreciated that the methods of the present invention are in no way limited to video (e.g., movie) content. Rather, the invention advantageously may be used to download and record other types of data and content, including without limitation gaming content and/or applications (e.g., those adapted for use with an X-box™, Playstation™ or the like), music content, musical/video content, applications (whether for use on the downloading platform or another device), and so forth.

It will also be recognized that the use of a cable (e.g., HFC) network as the basis of the illustrated embodiment can provide several salient benefits and advantages over other modes of download, e.g., PC-based download over an IP network such as the Internet. Specifically, the cable system carried enhanced security as compared to the Internet, the latter being a notoriously untrusted network having no indigenous security measures. In untrusted networks such as the Internet, users must "tunnel" packets across the network using a VPN or similar approach (e.g., secure sockets, TLS, or comparable transport layer security), or provide application layer encryption or the like. In contrast, the typical cable environment can be considered a trusted domain and hence more difficult to "hack", since it utilizes a variety of physical security measures for at least portions of its physical run (e.g., the various links within the system utilize physical measures to exclude access, and/or protocol to preserve the security of the link). Cable systems also provide their downstream content in an encoded and multiplexed stream, and can be configured to utilize application or other layer encryption protocols (sealers) such as AES or DES to ensure both a) data and source integrity (i.e., assurance that the data has not been tampered with) and b) confidentiality (prevention of access by unauthorized parties).

Cable systems can also be configured to authenticate their users and/or their CPE 106 if desired, thereby assuring user integrity (i.e., prevention of a "false" user standing in place of an authorized one). Such authentication may be via a SIM (subscriber identity module) or comparable approach, user PIN, link or other key (e.g., public/private encryption key), RAND and SRES challenge/response approach, etc.

Additionally, the cable network in-band paradigm offers the potential for significantly higher download speeds (i.e., greater than 6 Mbps cable modem speeds), thereby reducing the time needed to download a given content to the user and accordingly increasing their satisfaction in using this service. It will further be recognized that even higher rate systems may be used consistent with the invention, including those exceeding 1 Gbps, thereby providing a very high speed download, and hence very low latency associated with the recording and viewing processes described herein. Furthermore, other types of bearer mediums can be used consistent with the cable system. For example, in one alternate embodiment, the requested data or content is downloaded out-of-band (OOB) using the cable system's extant OOB infrastructure. While this path has typically much less data bandwidth, it is also far less loaded than in-band channels (QAMs). Alternatively, a hybridized approach can be used as previously referenced, such as where the data/content is downloaded in-band, yet where all or a portion of the communications necessary between the head-end and the CPE necessary to perform the download and recording are carried OOB.

It will also be appreciated that different carrier and/or multiplexing schemes can be used for the delivery of content or data consistent with the present invention, the latter being largely agnostic to its bearer medium. While the exemplary embodiments herein are described primarily in terms of an OD infrastructure adapted to transmit data over a single physical channel (e.g., 256-QAM modulated carrier) at any given time, it will be recognized that this "physical channel" may actually comprise one or more carriers. For example, in one multi-carrier variant of the invention, the content/data is streamed over multiple physical carriers according to a multiplexing algorithm such as that described in co-owned and co-pending U.S. patent application Ser. No. 11/013,671 filed Dec. 15, 2004 and entitled "Method And Apparatus For Wideband Distribution Of Content", incorporated herein by reference in its entirety. Under this approach, the data of a given TS can be multiplexed across a plurality of physical carriers, with the multiplexed signal being reassembled at the CPE 106 using a wideband tuner (or a plurality of related tuners). Information from the head-end as to the multiplexing scheme and channels used is provided to the CPE in order to enable it to de-multiplex (and decode) the multiplexed transport stream. Hence, for the purposes of the present invention, the aggregation of multiplexed channels acts like a single QAM.

As yet another option, two or more QAMs within the network can be established simultaneously (as part of a single session, or alternatively two distinct but related sessions) to achieve one or more desired objectives, such as an increased download speed or statistical multiplex pool size.

Notwithstanding, it will be appreciated that other (non-cable) networks such as the Internet can be used to provide the functionality described herein. For example, in one alternate embodiment, the aforementioned HFC cable system (and user CPE 106) is used as the basis for providing the user interface and purchase portal, whereas another network (e.g., IP-based network such as the Internet) is used to provide for a parallel or subsequent download capability. A portion of the IP network used for the download can also be co-extensive with the cable network itself if desired, such as where indigenous IP data service of the cable network is used to provide at least a portion of the pathway between the target CPE 106 and the data source (e.g., third party content server), the remainder of the pathway comprising the portion of the IP network from the MSO's IP network edge outward to the content source.

In another variant, the IP network is divorced from the HFC network, instead delivering the download content to the CPE 106 for storage/recording via another interface on the CPE or an associated device (such as a networked PC, wireless device, etc.). The CPE 106 can also act as a LAN or PAN node itself, such as where the CPE includes an 802.3 or similar Ethernet port.

It will also be recognized that under the present invention, the storage or recording devices (e.g., DVD burner) need not be co-located with the CPE 106. For example, in yet another variant, the delivery of the download data via an IP or similar network can be to a personal computer (PC) or other such device having a DVD burner installed therein. In this fashion, the cable or satellite subscriber can utilize the CPE user interfaces for ordering (and optionally previewing) the content, with the delivery of the content occurring via a separate modality (e.g., IP-based network) to another device, either contemporaneously or at a later time. A VOD or other session can also be used to view the purchased content at time of ordering (or later), while the "purchased" download is routed to another device for storage/recording.

The aforementioned non-HFC (e.g., IP) network approaches can utilize a higher level of security (as compared to their "untrusted" baseline configuration) to protect the transmitted content by employing any number of different mechanisms, such as application layer encryption (e.g., AES/DES), transport-layer security, VPN, etc., all of which are well known to those of ordinary skill. The aforementioned Windows DRM may also be used to provide added content protection over such untrusted networks. In still another embodiment of the invention, one or more "advanced" coder-decoders (codecs) are used in the system (e.g., CPE 106, DVD burner, etc.) in order to (i) permit the selective use of single-layer or comparable recording approaches by providing an increased compression ratio for the data to be recorded; and/or (ii) permit the provision of different types or formats of content or data to be utilized in a heterogeneous fashion. Specifically, in one embodiment, an MPEG-4 AVC (Advanced Video Coding) codec in accordance with ITU-T Standard H.264 is utilized to provide enhanced compression efficiency for the data. Such AVC codecs are commercially available, many of which more than double the compression efficiency of earlier codecs (i.e., maintains the same picture quality with 50% smaller bandwidth). Use of this codec therefore permits a smaller download bandwidth for the same content, which can be reflected in an increased download size in the same period of time, or a significantly reduced download time for the same size data file or content.

Furthermore, the reduction of file or content size by a factor of 2 or more provided by the exemplary AVC codec allows single-layer or comparable processes to be used in place of the dual-layer processes previously described, if desired. Hence, in one variant of the CPE 106, a multi-mode (i.e, dual- and single-layer) recording device is used, with the user (or an internal algorithm on the CPE 106) making a determination as to which recording process to utilize. In one variant, this decision can be driven by operational and/or economic factors; e.g., where either a single- or dual-layer process could be used with equal success, the algorithm would then select a recording process for use based on the most cost-effective alternative, such as where the single layer process is selected because the DVD blanks cost less. "Cost-per-blank" data can even be encoded on the medium itself, thereby allowing the recording device to select between two or more available media. Media or process selection can also be tied to codec selection/availability.

Alternatively, the algorithm can utilize a user-specified selection or hierarchy, such as where when confronted with the decision of selecting the single- or dual-layer process, the user's preferences are accessed as an input to the decision process. Such preferences or inputs may comprise, e.g., (i) checking the recorder(s) for blank media being present (thereby obviating the user having to load a new blank if one of either ilk is already present in the recorder); (ii) prompting the user to select one medium or the other; or (iii) accessing a preprogrammed user hierarchy or decision tree which automatically instructs the recording device as to which process to use under a given circumstance, such as "always default to single-layer where possible". Myriad other approaches to selecting or optimizing a recording process will be recognized by those of ordinary skill when provided the present disclosure.

In another variant, the Windows® Media Player Version 9 is used consistent with the invention. As is well known, this software comprises audio and video codecs, the Windows Media Encoder, Windows Media Server, Windows Media Software Development Kit (SDK), Digital Rights Management (DRM) technology, and an extensibility model that allows integration into third-party solutions.

As noted above, the present invention may also be implemented in a heterogenous manner; e.g., wherein the data or content downloaded or viewed by the user is encoded or compressed differently than that to be recorded onto the DVD or other media. For example, the aforementioned AVC or Windows Media Player 9 codecs could be used to compress the data destined for recording (thereby reducing the download and recording media bandwidth requirements), while the viewed version of the same content comprises a standard VOD or similar format. Conversely, the viewed content could be encoded or compressed according the AVC or Windows 9 format (so as to reduce VOD bandwidth consumption), and the content to be recorded encoded or compressed according to another format, or not at all.

Network Server

Figure 3:
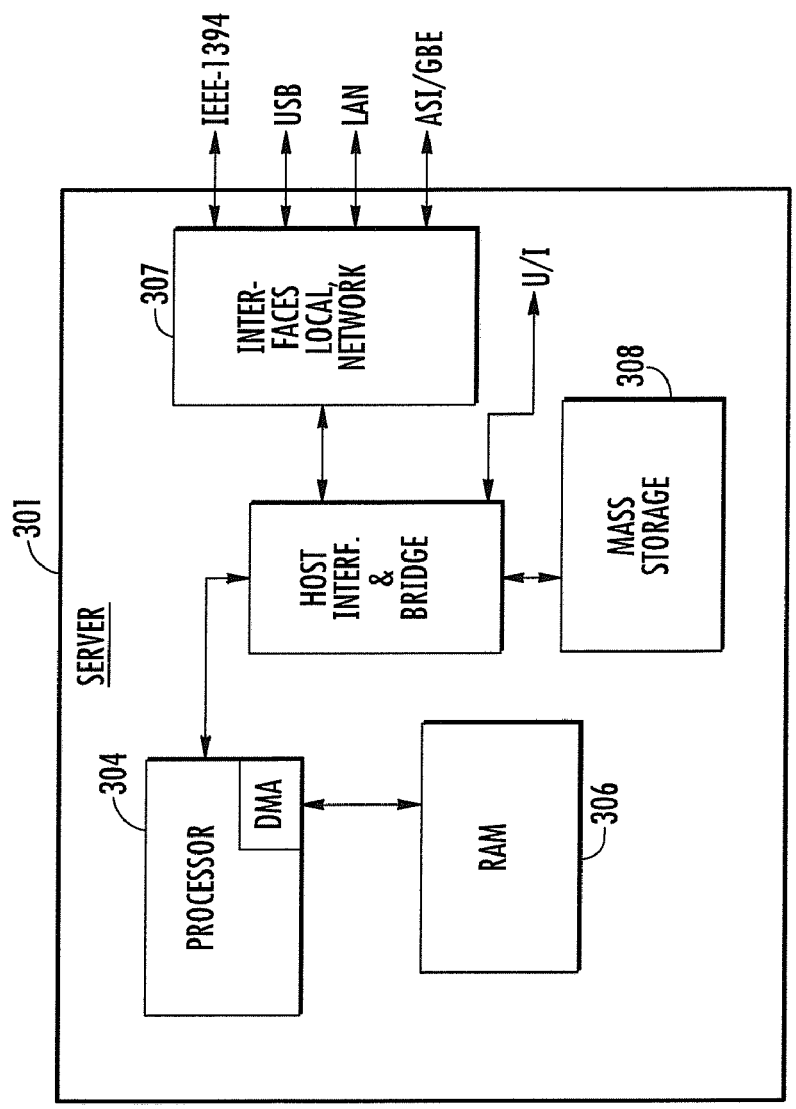
FIG. 3 is a functional block diagram illustrating a first exemplary embodiment of network server apparatus adapted for use in a cable network and implementing the download methodology of the present invention.

Referring now to FIG. 3, one embodiment of the improved network electronic device adapted for high-speed data download capability according to the present invention is described. As shown in FIG. 3, the device 301 generally comprises and OpenCable-compliant network server module adapted for interface with the HFC network 101 of FIG. 1 (e.g., the MEM 162 at the head-end, and/or the LAN 158, 160), digital processor(s) 304, storage device 306 (and optional mass storage device 308), and a plurality of interfaces 307 for use with other network apparatus such as IP routers and other packet network devices, network management and provisioning systems, local PCs, etc. Other components which may be utilized within the server device 301 include amplifiers, board level electronic components, as well as media processors and other specialized SoC or ASIC devices. Support for various processing layers and protocols (e.g., 802.3, DOCSIS MAC, B channels, DHCP, SNMP, H.323/RTP/RTCP, VoIP, SIP, LSCP, etc.) may also be provided as required. A VOD application is also disposed to run on the server module 301 to provide a functional interface for VOD session and download requests received from network CPE 106, or other interposed entities. These additional components and functionalities are well known to those of ordinary skill in the cable and embedded system fields, and accordingly not described further herein.

The server device 301 of FIG. 3 may take any number of physical forms, comprising for example one of a plurality of discrete modules or cards within a larger network head-end or edge device of the type well known in the art, including the MEM 162 itself. The server may also comprise firmware, either alone or in combination with other hardware/software components such as those previously described (e.g., disposed in the aforementioned edge device). Alternatively, the server module 301 may be a stand-alone device disposed at the head end or other location (such as a VOD server 105 or application server 104), and may even include its own RF front end (e.g., modulators, encryptors, etc.) or optical interface so as to interface directly with various portions of the HFC network 101. Numerous other configurations may be used. The server device 301 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, any required conditioning of the content before delivery (such as the inclusion of watermarking or other data, encryption, generation of encryption key pairs and/or challenges, and so forth) may take the form of one or more computer programs running on a single device disposed within the network (e.g., the VOD server module 105), such as at a head-end, node, or hub. Alternatively, such computer programs may have one or more components distributed across various hardware environments at the same or different locations, wherein various of the functions are distributed across the VOD servers 105, application servers 104 and other system components.

As yet another example, portions of the content download and protection functionality may be rendered as a dedicated or application specific IC (ASIC) or DSP having code running thereon. For example, a security processor of the type well known in the art can be used to implement encryption algorithms on the downloaded content, and/or to perform key pair generation and the like. Myriad different configurations for practicing the invention will be recognized by those of ordinary skill in the network arts provided the present disclosure.

In one exemplary embodiment, the server device 301 is coupled to a billing or other payment management module and configured so as to only permit initiation of a VOD session to start after the target content is purchased by the user; e.g., upon receipt of a "payment accepted" or comparable signal from the billing module. This approach implements the aforementioned coupling between the availability of the "new" content over the network and the purchase decision (i.e., the user can't watch the new content without first purchasing it, including burning it onto a DVD or other medium). The server operation can also be masked or controlled by a "business rules" engine" or other logical wrapper as described subsequently herein.

As described below with respect to the CPE of FIG. 4, the VOD session can also be restricted such that the session only allows for the download of the content to the users (temporary) storage device, during or after which the content is burned onto the designated hard media. Only then can the user view the content; i.e., directly from the burned media, just as if they had purchased the media retail.

CPE Architecture and Operation

Figure 4:
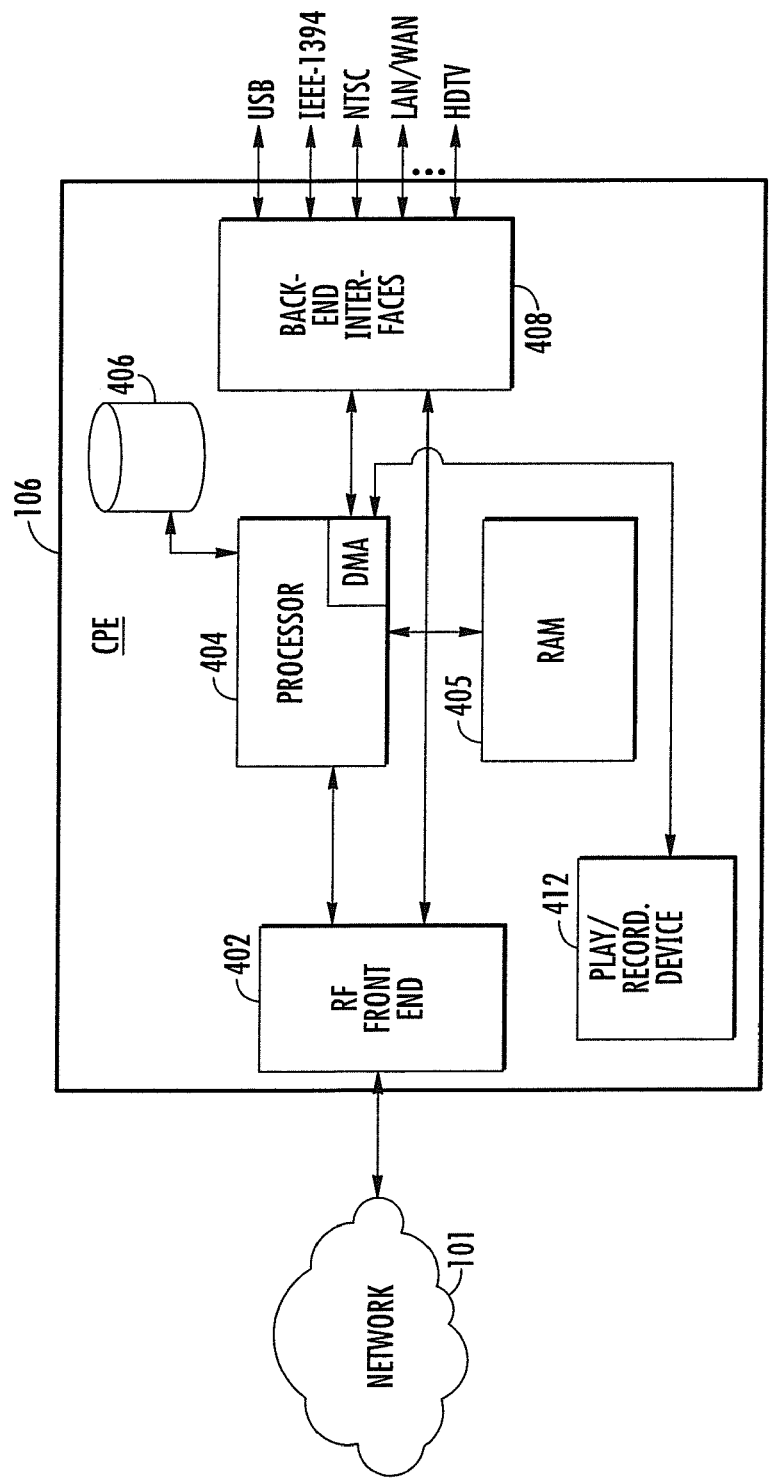
FIG. 4 is a functional block diagram illustrating a first exemplary embodiment of consumer premises equipment (CPE) adapted for use in a cable network and implementing the content download, recording and protection methodologies of the present invention.

FIG. 4 illustrates a first embodiment of the improved client device (e.g., CPE 106) with content download and recording capability according to the present invention. As shown in FIG. 4, the device 106 generally comprises and OpenCable-compliant embedded system having an RF front end 402 (including demodulator and decryption unit) for interface with the HFC network 101 of FIG. 1, digital processor(s) 404, RAM 405 and mass storage device 406, and a plurality of interfaces 408 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Notably, the device 106 also includes a recording device (e.g., DVD burner) 412 useful for recording the user's media, as well as (optionally playing it back after recording).

In the illustrated embodiment, the recording device 412 comprises a dual-mode (i.e., single-layer and dual-layer) DVD recorder/player of the type previously described herein, although other devices and capabilities may be substituted or used in tandem. The use of a dual-mode device allows the subscriber to make use of various types of media for different applications; e.g., a conventional or single-layer DVD blank for applications not requiring high data density or quality, and also dual-layer blanks where such higher density or quality is desired. The software client running on the CPE 106 (discussed below) can also be configured to automatically determine the density/recording medium requirements of a given content download, such as via metadata files or other data structures of the type described in U.S. patent application Ser. No. 11/013,665 filed Dec. 15, 2004 previously incorporated herein. Based on this data (and/or other data), the recording device can select the appropriate mode of recording, thereby potentially obviating any in situ detection or analysis of the content at the CPE (and hence allowing for a simpler or "thinner" CPE). It will be appreciated, however, that such in situ approaches can be used if desired, such as where it is desired to simplify the server-end process by relieving it of having to generate the metadata files and transmit them (e.g., for downstream bandwidth conservation).

Other components which may be utilized within the device (deleted from FIG. 4 for simplicity) include RF tuner stages, buffer memory (which may be implemented in the RAM 405 or otherwise), various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein. The device 106 of FIG. 4 may also be provided with an OCAP-compliant monitor application and Java-based middleware which, inter alia, manages the operation of the device and applications running thereon. It will be recognized by those of ordinary skill that myriad different device and software architectures may be used consistent with the display element manager of the invention, the device of FIG. 4 being merely exemplary. For example, different middlewares (e.g., MHP, MHEG, or ACAP) may be used in place of the OCAP middleware of the illustrated embodiment.

The processor 404 and internal bus and memory architecture of the CPE 106 of FIG. 4 is ideally adapted for high-speed data processing, at least sufficient to support the client-side processing tasks necessary to implement the high-speed content download and recording functionality of the present invention effectively in real time. This may be accomplished, e.g., through a single high-speed multifunction digital processor, an array of smaller (e.g., RISC) cores, dedicated processors (such as a dedicated MPEG media processor, CPU, and interface controller), etc.

Figure 4A:
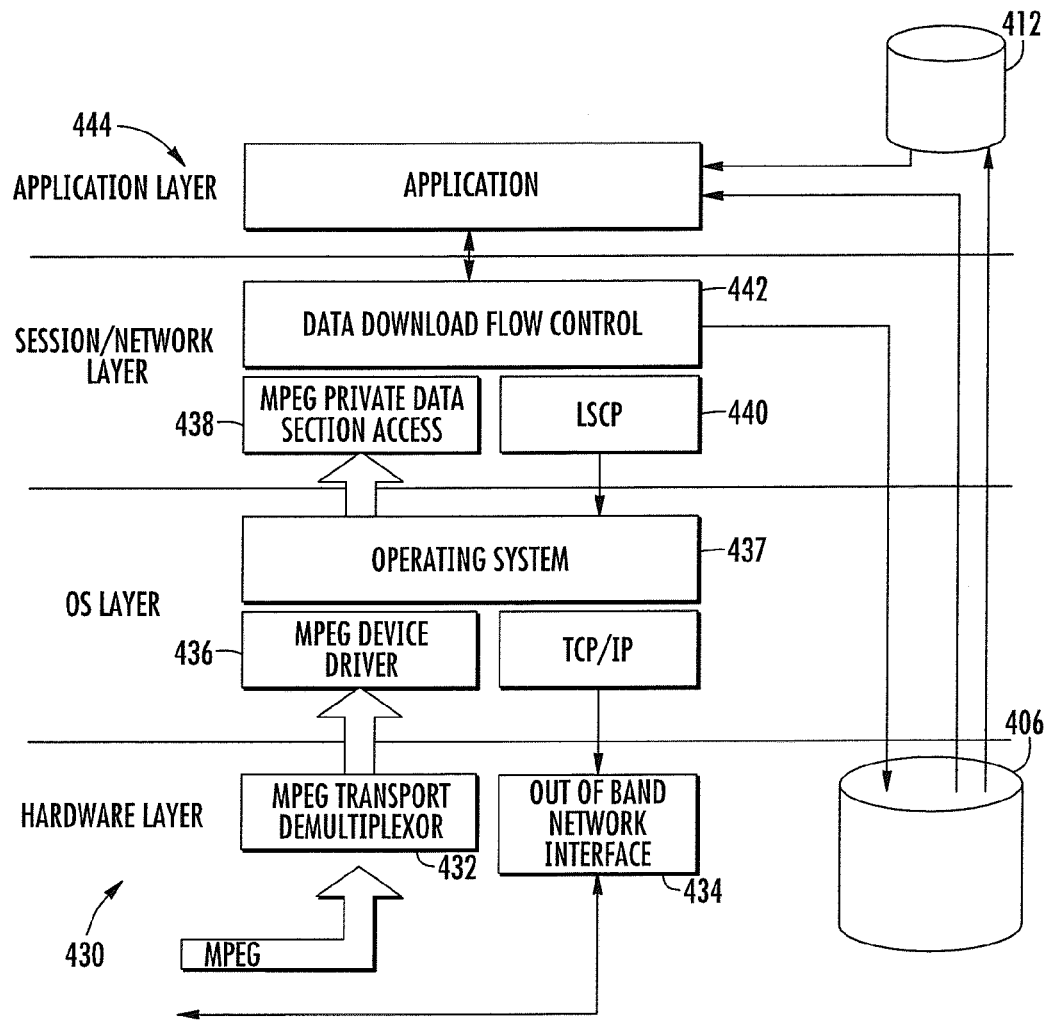
FIG. 4a is a logical block diagram illustrating a first exemplary software architecture which may be used consistent with the present invention.

FIG. 4a illustrates an exemplary configuration of the protocol stack 430 used on the CPE 106 of FIG. 4. Elements of this embodiment of the stack 430 include: (i) MPEG transport interface (demultiplexer) 432, (ii) OOB network interface 434, (iii) MPEG device driver 436, (iv) operating system (including aforementioned middleware) 437; (v) MPEG private data section access module 438, (vi) LSCP protocol module 440, (vii) content download flow control module 442, and (viii) content recording control module 443. As indicated in FIG. 4a, the local (or even remote) storage device 406, or alternatively RAM 405, is used to store data received by the CPE and extracted from the encoded packets as described in greater detail below. This data, which may comprise content files (such as executables, compressed data files, etc.) or other data structures is utilized such as for display or recording as previously described, or alternatively transmitted off-device for use by another processing entity such as a peripheral or client device to the CPE "host".

As part of the application layer 444 of the CPE 106, various different types of client applications may be running (or operable to run) consistent with the present invention. In one embodiment, a separate (dedicated) client application adapted for high-speed content download (and recording) may be used to interface with the lower layers of the stack 430 (including the data download flow control module 442). This may include, e.g., a separate GUI or other type of UI, and may operate substantially independent of other applications on the CPE 106. Alternatively, the download/recording functionality described herein may be integrated into one or more existing or downloadable applications (such as a VOD application, "Watch TV" application, navigator, TV-commerce application, or even EPG). The application (and even session) layer protocols necessary to control the download and recording functionality may even be disposed on another device (e.g., PDA or cellular smartphone) as previously described in order to instigate the download transaction and subsequent recording events. For example, the user may be able to use a client application (with SIP session layer) on their smartphone to negotiate, via e.g., a dial-in number or Internet URL, the purchase and download of a movie at a later time via their CPE.

As yet another option, the download and recording functionality nay be completely transparent to the end user, such as where a VOD application running on the CPE 106 (or an associated device) makes data download "calls" as necessary to the other components of the stack in order to (i) initiate a session if not already established, (ii) download the data, including any necessary error correction and/or retransmission, (iii) manage termination of the session; and (iv) record the downloaded data on the desired medium.

As previously noted, the server 301 can be used to restrict session instantiation until one or more preconditions (e.g., payment) are met, but the CPE 106 may also be used to provide all or part of this functionality. For example, the billing module or other entity can send an authorization signal to the CPE 106 directly, and the middleware (or other functionality) of the CPE controls the user's ability to instantiate the download or viewing session. In one variant, the server 301 controls the download (i.e., no download to the temporary storage location of the CPE until payment authorization cycle is complete), yet the ability to view the downloaded content is delegated to the CPE (e.g., upon the DVD burner signaling the middleware that the recording process is complete). In another variant, the server 301 controls and provides the download session to the temporary storage location, but the DVD burner or other target media device remains "locked" (such as based on SI or similar clock reference data) until a prescribed time/date coordinate when (i) the DVD burner can then complete its recording cycle, and (ii) the user can view the content. Other schemes for allocating and restricting session instantiation, data download, and viewing may be used consistent with the invention, as will be recognized by those of ordinary skill given the present disclosure.

The CPE middleware and any other relevant components may also be modified in order to provide a "universal" software interface for the data download and recording functions, such that application developers can write their applications to make use of this capability. Similarly, the "universal" CPE described in co-pending and co-owned U.S. patent application Ser. No. 10/782,680 filed Feb. 18, 2004 and entitled "Media Extension Apparatus And Methods For Use In An Information Network", incorporated herein by reference in its entirety, may be used consistent with the present invention in order to allow specific features (including data download and recording) to be configured by a particular MSO or other entity when the CPE is used in their network.

In another embodiment, the client application can function in response to signals or communications provided by a device in communication with the CPE 106. For example, the CPE 106 may comprise a wireless interface (e.g., 802.11a/g, Bluetooth, 802.15 PAN, 802.16 WiMAX, etc.) such that it can service data download and recording requests from client devices of the CPE 106 itself. In one such variant, the client device comprises a PDA, gaming console, or similar hand-held device that has a distributed portion of the client application running thereon. This application may be stand-alone or integrated with another application. Hence, users operating the distributed client application on the PDA will utilize their wireless interface to the CPE 106 in order to remotely instigate a data download and recording from the network via the CPE. The wireless forward channel(s) of the interface (e.g., CPE to PDA) can be used to transmit the downloaded data or content after reassembly by the CPE, or even stream the "raw" unassembled data (or even the received and demultiplexed MPEG encoded packets) to the PDA(s) for use thereby.

Myriad other schemes for integrating the data download and recording functions within the existing CPE software environment will be recognized by those of ordinary skill in the software arts when provided the present disclosure.

Business Methods and Considerations

Figure 5:
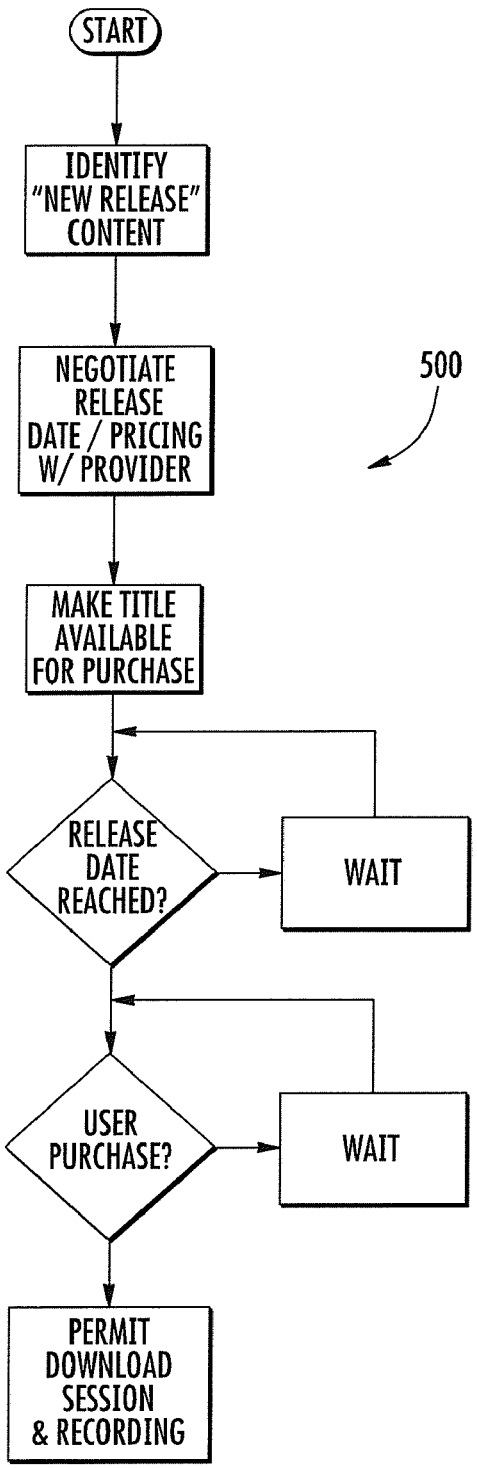
FIG. 5 is a logical flow diagram of one exemplary embodiment of the business methodology according to the present invention.

Referring now to FIG. 5, various exemplary business-related aspects of the content download and recording technology previously discussed herein are described in detail.

One salient benefit of the present invention is its ability to provide users (e.g., cable system subscribers) with the ability to download data and/or content, and record this information on a tangible medium or other vehicle of choice. This capability also provides the basis for a highly useful business model; i.e., the provision of new content or data at least contemporaneous with that provided by other distribution channels (e.g., DVD rentals or retail), with ostensibly a reduced level of effort required by the user.

As previously discussed, cable system and other content network operators have heretofore been at somewhat of a competitive disadvantage due to the latency inherent in the provision of certain data or content (e.g., certain new release movie titles) as compared to these other channels. New release DVDs will typically be available in the rental or retail stores such as Blockbuster® or NetFlix® well in advance of the availability of the same title on a VOD or similar service.

Advantageously, the download-and-record approach of the present invention removes this latency, and precludes the user from having to go to a specified retail or rental outlet to receive and view the content, since they can now merely download it (and optionally record it for unlimited personal use), all within the comfort of their own premises. Similarly, the time and effort expended under prior art mail-based approaches (such as Netflix), not to mention the delay associated with receiving the desired content by mail, is obviated under the present invention, since the user is presented with an easily accessed interface (via their television, PDA or the like) by which to order, receive, and produce the desired hard media copy in one simple transaction.

From the MSO and content generator perspective, the foregoing approach also obviates at least some of the physical distribution channels necessitated under the prior art, and also allows for a coupling between the viewing/recording and purchase events, such that retail and rental sales are not diminished by also contemporaneously providing the content for purchase over the cable (or satellite) network. Under one rental/retail approach, the physical media (e.g., DVDs) are recorded, and then physically shipped to the various retail or rental locations, thereby incurring additional cost and delay. Alternatively, the distribution and recording scheme of the present invention can be conducted so as to place the onus on the customer to obtain the physical medium "blanks", with the content being delivered to them over the cable or satellite system. The recording-capable CPE may be provided to customers on a new-installation or upgrade basis (or the customer can purchase their own device retail). Hence, there is very little additional overhead for the service or content provider associated with providing the content recording capability of the invention.

Another salient benefit of one embodiment of the business model of the invention relates to the user/subscriber never having to return the physical medium to the provider. For example, under prior art approaches, a rented DVD must always be returned to the provider, whether by drop-off (Blockbuster®) or mail (Netflix®). In contrast, the exemplary methods of the present invention allow the user to retain ownership of the tangible medium onto which the data or content is recorded, thereby making it akin to a purchase.

As previously described, it is also envisaged that the blank recording medium (e.g., DVDs) may also be purchased via the service provider and delivered to the user. These may be fungible blanks, or alternatively specially coded so as to restrict user opportunities for theft or unauthorized reproduction. Such delivery may be ad hoc (i.e., in response to a user request), or programmatic (i.e., at a given periodicity or in response to a user selection or usage metric). For example, in one variant, users of the service are provided with one or two blank DVDs with their monthly cable bill, such DVDs being very lightweight and not bulky. Alternatively, a third party provider such as Amazon.com, OfficeDepot.com, or even the user's home delivery grocery supplier (e.g., Vons.com) can be used as a conduit for delivery of the DVDs or other media in conjunction with the service provider, thereby making the process largely seamless to the subscriber.

Furthermore, the session-based approach of the exemplary embodiment described above advantageously allows for control of the download and recordation of the content, these two events also optionally being independently performed with respect to one another as previously described. In this fashion, the content provider for example can (in conjunction with the MSO) determine when the new content should be made available for purchase, and then permit users to download and record (see exemplary business method flow of FIG. 5, wherein both an availability or release date and the user's purchase of the content are used as gating criteria to permit the VOD session creation and subsequent content download to the user's CPE). A user can also be afforded the opportunity to plan out an extended period (e.g., a month's worth) of programming by downloading and recording new releases as they become available, and then view them at their leisure. For example, an MSO may make five new movies available within a given calendar week; the user can then purchase all of the titles in advance and program his/her CPE 106 to download the titles as they become available, or en masse after all have become available.

Third party content or data providers such as studios are also afforded yet another distribution channel for their content, thereby achieving further market penetration (especially for that segment which would otherwise buy and watch the content but for having to go through the machinations of either renting or buying it via extant prior art approaches). For example, one variant of the business model comprises providing the studio or other third party provider with a royalty or other compensation based on "sale" of each copy of the selected content, while the MSO or service provider also obtains a portion of the profit for use of its distribution infrastructure and services. The prices afforded to the user or subscriber may be set above, below, or in parity with those via retail outlets for example.

As previously noted, the business model(s) of the present invention also contemplate making the "new" content available via a video-only (e.g., conventional VOD) or other method after the content has aged somewhat, akin to prior art approaches where the availability of the new content over the cable or satellite network lags that via retail or rental outlets. The pricing of the video-only option can also be adjusted (e.g., reduced) if desired relative to the purchase options, thereby providing additional incentive for viewing by subscribers.

The distribution and recording paradigm of the present invention also provides a benefit in terms of its synergy with new subscriptions/users; i.e., by providing subscribers with the ability to download content that would otherwise have to be procured via one or more additional distribution channels. Hence, not only is the existing subscriber base more completely and effectively served by providing this new capability (such as via distribution of new CPE, or retrofits to their existing CPE using downloaded applications and perhaps expansion kits sent to each user), but many incipient or possible future subscribers are given an incentive to enter into a subscription, since such subscription obviates their need to go to the rental/retail outlets (and all of the associated effort), wait for their content selections to arrive by mail, or wait for the title to be later released via VOD or similar network channel. Furthermore, the restrictions placed on users of such other channels may be removed if desired, such as where the user can order any number of movies at any given time (instead of the "X-per-month" approach of Netflix and similar prior art services).

Hence, the present invention also gives content providers access to an otherwise untapped pool of profits and sales, since there is currently a significant number of people who would not rent or purchase any given content unless the cost/effort threshold is reduced. Stated differently, by making download and purchase nearly effortless and low enough in cost, more people will view movies or other content more often, thereby increasing the content provider's effective penetration into a given demographic.

Furthermore, as previously discussed, many portions of the HFC network advantageously are physically protected, and additional encryption and security measures are provided all the way to the CPE so as to prevent signal theft and access to sensitive customer data. This added physical and higher layer security provides content developers and providers with additional assurances that their valuable content will be protected, as compared to a completely untrusted network such as the Internet. Also, copying and distribution rules can be enforced via the CPE hardware and software; e.g., allowing only one copy of a given download to be made, or marking copies with digital rights notice or protective measures (such as digital watermarking, encryption key generation, authentication of the recording or copying device, etc.), as contrasted with Internet-based "ripping" of content via peer-to-peer or similar uncontrollable network models.

In another aspect of the invention, the aforementioned download and recording function is rendered as one or more computer programs running at, e.g., the VOD server 105 or SRM, and further includes a so-called "business rules" engine. This engine comprises, in an exemplary embodiment, a series of software routines adapted to control the operation of the download and recording algorithms previously described. In effect, the business rules engine comprises a wrapper or controller entity which monitors the OD session requests received by the server 105 and dynamically (or manually) controls the operation of the server (and to some degree the CPE 106 or other data recipient) to implement a prescribed set of business rules. For example, one business rule may state that no VOD or other content download session may be instantiated until a payment authorization/confirmation is received. Another business rule may comprise the policy that data download bandwidth (and/or recording functionality) are weighted or skewed based on profitability or similar considerations, allocating available bandwidth preferentially to higher-profit delivery channels or subscribers, or even service level (e.g., HD versus SD).

As another exemplary business rule, download requests from those subscribers having a download subscription (as compared to a standard service subscription) are serviced first. Hence, all users submitting download requests are processed in real time, yet the download subscribed users are given priority for download, and hence shorter perceived latency from request to download completion.

As yet another exemplary business rule, download requests are allocated bandwidth (capacity) based on the inverse of the download size, thereby somewhat normalizing the perceived latency across all users. For example, a first subscriber requesting a 1 Gb download may be allocated bandwidth sufficient to provide a download rate (Mbps) that is ten (10) times that of a similar user requesting a 100 Mb download. Hence, if both downloads are started at the same time, both will complete at the same time. This might be the case where a certain file type (e.g., standard definition versus higher definition content) is being requested for download by dissimilarly equipped subscribers.

Other types of business rules can be applied as well. For example, it may be desirable to alter the availability window for downloads into certain time slots, such that traditional VOD or other network functions are not adversely impacted (e.g., the user's PVR commands are not slowed during prime time viewing due to too many high-speed content downloads being requested within a given service area). As previously discussed, the availability of the download can also be restricted so as to be contemporaneous with, or bear some other temporal relationship to, the release of the same content via other distribution channels.

Alternatively, business rules may be applied across other demographics and parameters such as geography and service group.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing content over a content delivery network, said method comprising:
   providing a viewable form of said content over a first distribution channel of said network;
   providing a non-viewable form of said content over a second distribution channel of said network, said non-viewable form comprising a disk image for generating a digital video disk (DVD) of said content; and
   recording said non-viewable form of said content onto a DVD video disk medium;
   wherein said content is made available via said network contemporaneously with the theatrical release of said content, and
   wherein said acts of providing said first and second forms of said content are linked via a purchase transaction such that the purchase of said non-viewable form of said content causes both said acts of providing.

2. The method of claim 1, wherein said network comprises a cable network, and said first and second channels comprise first and second in-band channels.

3. The method of claim 1, wherein said network comprises a cable network, and said first and second channels comprise an in-band channel and out-of-band channel, respectively.

4. The method of claim 3, wherein at least one of said first content and said second forms of said content comprises content encoded using a high-density codec.

5. The method of claim 4, wherein said high-density codec comprises an MPEG-4 or H.264 codec.

6. The method of claim 1, wherein said second form of said content comprises encoding said content using a high-density codec.

7. The method of claim 1, further comprising preventing said recording from occurring more than a predetermined number of times.

8. The method of claim 1, wherein said act of recording comprises recording onto a medium that has at least one of (i) a limited number of plays, and (ii) a limited useable lifetime.

9. The method of claim 1, wherein at least one of said viewable and non-viewable form of said content is copyright protected, said copyright protection comprising preventing said act of recording from occurring more than a predetermined number of times.

10. The method of claim 1, wherein said content is received in said viewable format at a first time period, and said content is received in said non-viewable format at a second time period, said second time period occurring after said first time period, and said recording said non-viewable form of said content onto a DVD video disk medium not occurring until said second time period.

11. A consumer premises device in a content delivery network configured to enable a user to record and to view content, said device comprising:
- a processor;
- a storage device in data communication with said processor;
- a network interface in data communication with said processor, said network interface being configured to:
  - receive data indicating availability of content for purchase;
  - transmit a request to purchase said content; and
  - in response to said request to purchase, receive said content, said content being received on a first distribution channel as a content stream for display to said user, and on a second distribution channel as a non-viewable disk image; and
- a recording device in data communication with at least one of said processor and storage device, said recording device being adapted to record said disk image to a digital video medium.

12. The device of claim 11, wherein data indicating said availability of said content for purchase is received substantially contemporaneously with the theatrical release of said content.

13. The device of claim 11, further comprising at least one computer program running on said device configured to establish said session between said device and a network content delivery entity, said session comprising an amount of allocated bandwidth in excess of a baseline video on demand (VOD) program bandwidth by a multiple thereof.

14. The device of claim 13, wherein said content is received from said network via said session established between said device and said network content delivery entity.

15. The device of claim 13, wherein said multiple of said baseline VOD program bandwidth comprises an amount that is double or triple that of baseline VOD program bandwidth.

16. The device of claim 11, wherein said content is received in said viewable format in a first time period, and said first content is received in said non-viewable format during a second time period, said second time period occurring prior to said first time period, and said recording of said disk image to said medium not occurring until said second time period.

17. The device of claim 11, wherein said recording device is further adapted for dual-layer recording and a second recording process, said recording device being configured to select between said second process and said dual-layer recording based at least in part on data contained within said content.

18. The device of claim 11, wherein said recording device comprises a device adapted for single-layer optical recording of data encoded according to a high-density coder-decoder (codec).

19. The device of claim 11, further configured to receive a cryptographic key required to effect said recording.

20. A network headend apparatus for delivering content to a plurality of user devices via a content delivery network, said headend entity comprising:
- a first interface for receiving content in first and second formats;
- a second interface for providing content in said first and second formats to said plurality of user devices on first and second distribution channels respectively, said first format comprising an immediately viewable format, and said second format comprising a non-immediately useable disk image; and
- a processor configured to run at least one computer program thereon, said at least one computer program comprising a plurality of instructions which when executed, provide, substantially in response to a request to purchase said content from one of a plurality of consumer devices, said content to said one of said plurality of consumer devices in both said first and said second formats;
- wherein said one of said plurality of consumer devices is configured to:
  - cause display of said content in said first format; and
  - to record said content in said second format to a digital video medium.

21. The apparatus of claim 20, wherein said provision of said content in said first format occurs substantially prior to said provision of said content in said second format.

22. The apparatus of claim 21, wherein a time period of said provision of said content in said first format corresponds to a theatrical release date of said content.

23. The apparatus of claim 21, wherein a time period of said provision of said content in said second format corresponds to a date on which said content is available for sale on digital video media.

24. The apparatus of claim 20, wherein said one of said plurality of consumer devices comprises consumer premises equipment (CPE) adapted for dual-layer optical recording.

25. The apparatus of claim 20, wherein at least one of said first and second formats of said content further comprises at least one mechanism for copyright protection.

26. The apparatus of claim 20, wherein said at least one mechanism for copyright protection comprises at least one of i) digital watermarking; and ii) control of the number of copies of said content that can be recorded.

27. A method of providing content over a content delivery network, said method comprising:
- providing a viewable form of said content via a first distribution channel;
- providing a disk image for generating a digital video disk (DVD) of said content via a second distribution channel; and
- wherein said content is provided in said viewable form contemporaneously with the theatrical release of said content, and
- wherein said acts of providing said first and second forms of said content are linked via a purchase transaction such that the purchase of said disk image for generating a digital video disk (DVD) of said content causes both said acts of providing.

28. The method of claim 27, wherein said network comprises a cable network, and said distribution channel comprises an in-band channel thereof.

29. The method of claim 27, wherein at least one of said viewable and disk image form of said content is copyright protected.

30. The method of claim 27, wherein said content is received in said viewable format at a first time period, and said content is received in said disk image format at a second time period, said second time period occurring after said first time period.

31. A method of providing content to a plurality of consumer devices in a content distribution network, comprising:
   enabling one or more of said plurality of consumer devices to purchase said content;
   providing, in response to said purchase, said content in two formats, a first format comprising a video stream of said content provided directly to said one or more of said plurality of client devices over a first delivery channel, and a second physical medium containing a second format comprising a disk image of said content provided over a second delivery channel; and
   wherein said content is provided as said video stream contemporaneously with the theatrical release date of said content;
   wherein said content is provided on said physical medium on a date subsequent to said theatrical release date; and
   wherein said acts of providing said first and second forms of said content are linked via a purchase transaction such that the purchase of said content in said physical medium form causes said act of providing said content as said video stream.

32. The method of claim 31, wherein said physical medium comprises a digital video disk (DVD) and said date on which said content is provided on said DVD is contemporaneous with a first date on which said DVD is available for sale in stores.

* * * * *